(12) United States Patent
Wieder

(10) Patent No.: US 7,884,274 B1
(45) Date of Patent: Feb. 8, 2011

(54) ADAPTIVE PERSONALIZED MUSIC AND ENTERTAINMENT

(76) Inventor: James W. Wieder, 4276 Hermitage Dr., Ellicott City, MD (US) 21042

( * ) Notice: Subject to any disclaimer, the term of this patent is extended or adjusted under 35 U.S.C. 154(b) by 1169 days.

(21) Appl. No.: 10/605,879

(22) Filed: Nov. 3, 2003

(51) Int. Cl.
*G04B 13/00* (2006.01)
*G10H 7/00* (2006.01)

(52) U.S. Cl. .............................. 84/609; 84/610; 84/634; 84/649; 84/650; 84/666; 360/55

(58) Field of Classification Search ................... 705/50; 707/3, 4, 6, 104.1; 709/203; 715/811; 360/55; 84/609, 610, 634, 649, 650, 666
See application file for complete search history.

(56) References Cited

U.S. PATENT DOCUMENTS

| | | | |
|---|---|---|---|
| 4,788,675 A | 11/1988 | Jones et al. | 370/69.1 |
| 5,592,511 A * | 1/1997 | Schoen et al. | 375/220 |
| 5,616,876 A | 4/1997 | Cluts | 84/609 |
| 5,719,786 A | 2/1998 | Nelson et al. | |
| 5,732,216 A | 3/1998 | Logan et al. | |
| 5,801,747 A | 9/1998 | Bedard | |
| 5,848,396 A | 12/1998 | Gerace | |
| 5,894,119 A | 4/1999 | Tognazzini | 235/375 |
| 5,913,204 A | 6/1999 | Kelly | 705/500 |
| 5,918,213 A | 6/1999 | Bernard et al. | 705/26 |
| 5,926,624 A | 7/1999 | Katz | |
| 5,945,988 A | 8/1999 | Williams et al. | |
| 5,963,916 A | 10/1999 | Kaplan | |
| 5,973,250 A | 10/1999 | Zirille et al. | 84/600 |
| 5,973,612 A | 10/1999 | Deo et al. | |
| 5,977,964 A | 11/1999 | Williams et al. | |
| 6,005,597 A | 12/1999 | Barrett et al. | |
| 6,020,883 A | 2/2000 | Herz et al. | |
| 6,232,539 B1 | 5/2001 | Looney et al. | 84/609 |
| 6,246,672 B1 | 6/2001 | Lumelsky | 370/310 |

(Continued)

FOREIGN PATENT DOCUMENTS

EP  03104970.3  12/2003

(Continued)

OTHER PUBLICATIONS

"Apple's plan to offer music hits right note." Lincoln Journal Star, May 21, 2003; p. 7.*

(Continued)

*Primary Examiner*—Ella Colbert
*Assistant Examiner*—Daniel L Greene, Jr.
(74) *Attorney, Agent, or Firm*—James W. Wieder

(57) ABSTRACT

A method and system for providing a personalized entertainment experience that is customized for each user. The history of user control actions (such as "forward" and "back") associated with each played composition are captured as positive or negative user feedback about each composition. A customized sequence of compositions may be automatically generated for each user by utilizing the prior history of user control actions. The personalized sequence automatically adapts to changing user feedback over time. The user's collection of compositions is automatically integrated with the generated customized sequence. Additional compositions and samples, that are new to a user, may be automatically chosen based on the prior user feedback history and may be added to the user's collection when positive user feedback occurs during playback.

48 Claims, 12 Drawing Sheets

U.S. PATENT DOCUMENTS

| | | | |
|---|---|---|---|
| 6,248,946 | B1 | 6/2001 | Dwek ............... 84/609 |
| 6,253,237 | B1 | 6/2001 | Story et al. |
| 6,295,555 | B1 | 9/2001 | Goldman ............... 709/219 |
| 6,317,722 | B1 * | 11/2001 | Jacobi et al. ............... 705/14 |
| 6,349,329 | B1 | 2/2002 | Mackintosh et al. |
| 6,385,596 | B1 | 5/2002 | Wiser et al. ............... 705/51 |
| 6,389,467 | B1 | 5/2002 | Eyal |
| 6,410,837 | B2 * | 6/2002 | Tsutsumi ............... 84/604 |
| 6,423,892 | B1 | 7/2002 | Ramaswamy |
| 6,430,573 | B1 | 8/2002 | Pachet et al. ............... 707/104.1 |
| 6,438,752 | B1 | 8/2002 | McClard |
| 6,452,083 | B2 | 9/2002 | Pachet et al. ............... 84/609 |
| 6,460,036 | B1 * | 10/2002 | Herz ............... 707/10 |
| 6,484,199 | B2 | 11/2002 | Eyal |
| 6,496,802 | B1 | 12/2002 | Van Zoest et al. |
| 6,502,194 | B1 | 12/2002 | Berman et al. |
| 6,507,764 | B1 | 1/2003 | Parrella et al. ............... 700/94 |
| 6,519,648 | B1 | 2/2003 | Eyal |
| 6,529,584 | B1 | 3/2003 | Ravago et al. |
| 6,539,395 | B1 | 3/2003 | Gjerdingen et al. |
| 6,552,254 | B2 | 4/2003 | Hasegawa et al. |
| 6,555,738 | B2 | 4/2003 | Hughes et al. ............... 84/609 |
| 6,570,080 | B1 | 5/2003 | Hasegawa et al. |
| 6,594,699 | B1 | 7/2003 | Sahai |
| 6,609,096 | B1 | 8/2003 | DeBonet et al. |
| 6,609,105 | B2 | 8/2003 | Van Zoest et al. |
| 6,647,417 | B1 | 11/2003 | Hunter et al. |
| 6,662,231 | B1 | 12/2003 | Drosset et al. |
| 6,701,355 | B1 | 3/2004 | Brandt et al. |
| 6,721,954 | B1 | 4/2004 | Nickum |
| 6,735,628 | B2 | 5/2004 | Eyal |
| 6,941,275 | B1 | 9/2005 | Swierczek |
| 6,941,324 | B2 | 9/2005 | Plastina et al. |
| 6,990,453 | B2 | 1/2006 | Wang et al. |
| 7,139,723 | B2 | 11/2006 | Conkwright et al. |
| 7,146,329 | B2 | 12/2006 | Conkwright et al. |
| 7,194,421 | B2 | 3/2007 | Conkwright et al. |
| 7,197,472 | B2 | 3/2007 | Conkwright et al. |
| 7,236,941 | B2 | 6/2007 | Conkwright et al. |
| 7,627,477 | B2 | 12/2009 | Wang et al. |
| 2002/0002897 | A1 | 1/2002 | Pachet ............... 84/609 |
| 2002/0077985 | A1 | 6/2002 | Kobata |
| 2002/0078029 | A1 | 6/2002 | Pachet ............... 707/1 |
| 2002/0103796 | A1 * | 8/2002 | Hartley ............... 707/4 |
| 2002/0120564 | A1 | 8/2002 | Strietzel |
| 2002/0120577 | A1 | 8/2002 | Hans |
| 2002/0166440 | A1 * | 11/2002 | Herberger et al. ............... 84/625 |
| 2003/0001978 | A1 | 1/2003 | Smith |
| 2003/0014436 | A1 | 1/2003 | Spencer |
| 2003/0046213 | A1 | 3/2003 | Vora |
| 2003/0046244 | A1 | 3/2003 | Shear |
| 2003/0187953 | A1 | 10/2003 | Pearson et al. |
| 2004/0024688 | A1 | 2/2004 | Bi et al. |
| 2004/0054923 | A1 | 3/2004 | Seago |
| 2004/0254883 | A1 | 12/2004 | Kondrk et al. |
| 2004/0254957 | A1 | 12/2004 | Hyotyniemi et al. |
| 2005/0227674 | A1 | 10/2005 | Kopra et al. |
| 2007/0050360 | A1 | 3/2007 | Hull et al. |

FOREIGN PATENT DOCUMENTS

| | | |
|---|---|---|
| WO | WO02102079 | 6/2002 |
| WO | WO02067447 | 8/2002 |
| WO | WO 02067447 A2 * | 8/2002 |
| WO | WO 02102079 A1 * | 12/2002 |

OTHER PUBLICATIONS

Cohen, Peter. "iTunes 3.0.1 released." Macworld, Sep. 18, 2002.*

Fanning, David. "Review: iTunes 3.0.1." Macworld, Apr. 1, 2003.*

"Week in Review." Los Angeles Times, May 4, 2003; p. C2.*

Automatic Music Selection for Changing Driving Patterns available @ http://www.priorartdatabase.net/IPCOM/000153848/, last accessed Jan. 22, 2008.*

Home (Computer) Terminal Musical Program, IBM Technical Disclosure Bulletin, Dec. 1, 1980.*

Wahid, Sa "How Habits are Formed by Our Mind." Oct. 27, 2006. EzineArticles.com. last accessed Sep. 19, 2008 @ <http://ezinearticles.com/?How-Habits-are-Formed-by-Our-Mind &id=339888>.*

Name That Tune—Wikipedia, the free encyclopedia, pp. 1-12, available @ http://en.wikipedia.org/w/index.php?title=Name_That_Tune&printable=yes, last accessed Sep. 26, 2008.*

Csinger et al. AI Meets Authoring: User Models for Intelligent Multimedia, available online at http://www.cs.ubc.ca/labs/lci/papers/docs1995/csinger-air.pdf, last accessed Dec. 18, 2010.*

Claudine Conrado, et al; Privacy in an Identity-based DRM System; IEEE Proceedings of the 14th Internatl Workshop on Database and Expert Systems Applications (DEXA'03).

Kyung-Ah Chang, et al; Multimedia Rights Management for the Multiple Devices of End-User, IEEE Proceed. of 23rd Interntl Conf on Distributed Computing Systems (ICDCSW'03).

Jonker, et al; Digital Rights Management in Consumer Electronics Products; IEEE Signal Processing Magazine , Mar. 2004.

Koenen, et al; The Long March to Interoperable Digital Rights Management; Proceedings of the IEEE, vol. 92, No. 6, Jun. 2004.

Takanori Senoh, et al; DRM Renewability & Interoperability; IEEE 2004 p. 424-429.

Niels Rump; Can Digital Rights Management Be Standardized?, IEEE Signal Processing Magazine, Mar. 2004 p. 63-70.

David Geer; Digital Rights Technology Sparks Interoperability Concerns; IEEE Computer Magazine, Dec. 2004.

Walt Rocks: Rating the New Muisc Sites; Wall Street Journal, Oct. 22, 2003.

With the Web Shaking Up Music, A Free-for-All in Online Songs; Wall Street Journal, Nov. 19, 2003.

New Web Music Stores Offer Unique Features, and One is a Winner; Wall Street Journal, Apr. 1, 2004.

Claudine Conrado, et al; Privacy in an Identity-based DRM System; IEEE Proceedings of the 14th Internatl Workshop on Database and Expert Systems Application, 2003.

Kyung-Ah Chang, et al; Multimedia Rights Management for the Multiple Devices of End-User; IEEE Proceed. of 23rd Interntl Conf on Distributed Computing Systems, 2003.

* cited by examiner

Fig. 5

| User History: | | | | | | | | | |
|---|---|---|---|---|---|---|---|---|---|
| Comp # | Usage-Rights Tokens | Avail locally ? | Current enjoyment | Peak enjoyment | Times heard | Play History. Last heard. | Targeted Time between playbacks | User Control Actions. Feedback History. | Likeability Curves, Functions |
| 854108 | per | y | 100 | 100 | 5 | | | | |
| 35139 | | y | 35 | 65 | 27 | | | | |
| 33865 | u | n | 5 | 85 | 47 | | | | |
| 894185 | n | y | 65 | 65 | s2 | | | | |
| | | | | | | | | | |

Fig. 9

Aggregate One-to-One Likeability Index:

| If Like Comp # | Also liked Comp # | # Users Sampled | # Users Liking both | % Users liking both |
|---|---|---|---|---|
| 854108 | 883491 | 21,603 | 19,226 | 89 |
| | 103293 | 34,885 | 30,349 | 87 |
| | 527177 | 22,673 | 17,004 | 75 |
| | ........ | | | |
| 854109 | 1429108 | 1,852 | 1,555 | 84 |
| 854110 | ........ | | | |
| | ........ | | | |

Fig. 10

| Aggregate Many-to-One Likeability Index: | | | | | | |
|---|---|---|---|---|---|---|
| If user likes these | | | | | | |
| Comp # | Comp # | Comp # | Also liked Comp # | # Users Sampled | # Users Liking all | % Users liking both |
| 854108 | 8833491 | 107389 | 2308845 | 19,176 | 15,533 | 81 |
| | | | 6332952 | 1,456 | 1,150 | 79 |
| | | | 4285503 | 11,062 | 8,628 | 78 |
| | | | ......... | | | |
| 854108 | 8833491 | 35139 | 843004 | | | |
| | | | | | | |

ADAPTIVE PERSONALIZED MUSIC AND ENTERTAINMENT

COPYRIGHT STATEMENT

©2003 James W. Wieder. A portion of the disclosure of this patent document contains material which is subject to copyright protection. The copyright owner has no objections to the facsimile reproduction by any one of the patent disclosure, as it appears in the Patent and Trademark Office patent files or records, but otherwise reserves all copyright rights whatsoever. This notice applies to the software and data described below and to the drawings hereto.

BACKGROUND OF INVENTION

1. Field of the Invention

This invention relates to the generation of an adaptive personalized entertainment experience (comprised of music, music videos, etc) that is customized for each user and more particularly to a system and method for providing a customized entertainment experience based upon capturing a history of user control actions (such as forward and back) while each composition is playing, in-order to automatically adapt the future sequence of compositions for each user.

2. Description of Related Art

Existing methods for entertaining a listener (or viewer) with music or music videos (or other entertainment) have numerous limitations that result in a less than an ideal user experience.

A major limitation with broadcast media such as radio and television is that the user has no control over the channel stream. If the listener does not like the current composition, the listeners only option is to change to another station or channel. However, there is typically a limited number of alternate channels of music suitable for the user. In addition, to switch quickly to a suitable alternative channel requires the user to have found and pre-selected the alternate channels of interest. When the user does switch channels, the new channel will most likely be somewhere in the middle of a composition, advertisement or other audio presentation. Recently commercial-free radio is being offered via satellite radio (e.g., XM Radio) and some internet radio stations, but the music is not customized to each user. Another major limitation of broadcast is that there is no link between the broadcast stream and the user's music collection. If the listener does hear a song they would like to add to their music collection, they typically need to remember the artist, album and song so it can be located or acquired at some later time. Often, the information needed to acquire a song (artist, album, title, etc) is not available at broadcast time when the listener is interested in it.

A major limitation of purchased albums on media such as CD's, DAT, tapes, and DVD's is that the user must expend considerable effort to be able to identify what they want and then to locate the media at a vendor and then purchase it. In order to purchase a media, the listener must be able to identify the specific album desired by artist and album name. Each purchased media may include many compositions that the user does not want. Sometimes the listener may purchase the wrong album by mistake. Once purchased, the listener must provide physical storage for the media and then later locate and insert the media to playback the compositions. To playback a particular song, the user must remember the particular media (e.g., CD) the song is located on and then be able to find that specific media among perhaps 100's of similar looking media. The user must also coordinate and physically transport the media between the user's various locations and devices (e.g. home, car, portable player, etc). Often, a desired album's media may not be at the desired user's location. In addition, media players hold only a limited of number of media so the user is limited to a playback stream from a limited number of albums at any one time. For certain locations, such as in an automobile, the locating, handing and inserting the media may be a safety distraction. The order of playback is limited to the composition order on the media, the random ordering of the media compositions and/or perhaps a playlist the user manually defines. The media is subject to scratching or other physical damage, requiring the user to create backup copies or purchase replacement copies. The physical media may have a physical lifetime which is much shorter then the user's. In addition, due to the rapid rate of technological change, vendor support for a given media format may be less than the user's lifetime.

An emerging technology, is the storage and management of the user's music collection on the user's personal computer (PC). With compression technology (such as MP3 or WMA formats), approximately 2500 (near CD quality) songs can be stored per 10 Gbyte of hard disc capacity. Since PC's with 30 to 100+ Gbyte discs are now commonly available, now or in the near future, PC's will have sufficient capacity to hold a user's full music collection in compressed format. The user's collection is typically managed on the PC by interactive windows driven software, which the user must install and learn to use. The user must expend a significant effort to build their collection of compositions. The user may expend significant effort to convert their previously purchased media (such as CD's) into suitable compressed files on the PC hard drive. Even using high read/write rate drives, such a conversion could take 3 to 10 minutes per CD and 5 to 16 hours for a collection of 100 CD's. The quality of the compressed file is determined by the user's ability to operate the compression software and select the appropriate compression settings for each composition.

An emerging way of building a music collection on the user's PC is the purchase and down load of songs in a suitable compressed format across the internet. The major providers of downloadable songs include PressPlay, AOL MusicNet, FullAudio MusicNow, and MusicMatch. Users use the PC to locate, purchase and download new songs over the internet. A major limitation of this approach is that the user must be able to identify the artist, album and song by name. Disadvantages include that the user must manually locate each song within the catalog of songs in the provider's database, by typically either reading through an alphabetical list of songs by musical category (genre), artist, album or alternatively by performing a search for each song via a search tool. They may have to navigate a separate set of web pages to locate and download the composition. In some cases, a web page may provide a short sample of a song which may be heard before purchasing and downloading the full song. The user may have to wait while the download is occurring, in order to verify it downloaded correctly. An additional disadvantage is that the additional cost of the PC may exceed the cost of the user's playback device. In addition, the user must learn to use the PC and its software. The user must manage the downloaded composition once it's been downloaded. The user may have to manually create playlists and later relocate the user created playlists by the playlist name.

Some users have built a portion of their collection via music piracy and file sharing software, often using peer-to-peer networks across the internet. The user faces ethical and legal issues. The user faces additional security and privacy issues associated with the peer-to-peer networks and the associated software such as viruses, worms, spyware, and stealth software. In addition, the quality of each music file is unknown and not guaranteed, since there are multiple good, marginal, bad and bogus versions of each song out on the network. The user must expend effort to locate the artist, album and song. Then, after waiting for the download to complete, the user must determine if the quality of the downloaded song is acceptable, and begin the process again if the quality is insufficient. The quality of the pirated song may be well below the quality of the original version.

Once the collection is built, the user must manage their collection of songs on the PC storage device. Using windows driven software on the PC, the user must manually select among the songs in their collection to create one or more playlists. In addition, the user must periodically back-up their collection on the PC to protect against loss due to drive failure, fire, damage or theft. For large collections, this is so inconvenient and time consuming, it is often not done frequently enough or not done at all, placing at risk of loss of all the user's efforts in building their collection. There are many competing file formats (MP3, WMA, AAC, etc), which only operate with certain vendor's hardware and/or software. The formats are constantly evolving and may have a limited vendor support lifetime. The user's collection in a particular format may no longer be supported at some point in time, requiring considerable user effort to convert the collection into another supported format, if a conversion is even possible.

Several new types of music players, including portable players, have emerged that are capable of handling compressed storage formats. The user's collection and playlists for these devices are typically managed via interactive windows software on the user's PC. For players with limited storage capacity (e.g., SonicBlue Rio MP3 player), PC software is used to select a limited portion of the user's collection, which is then sent to the player's memory over a cable or loaded onto memory media or a memory device which the user can insert into the portable player. Some recent players (such as Apple's iPod, Creative's Nomad Jukebox Zen, or PhatNoise's PhatBox) have large enough hard disc storage (10 to 30 Gbyte) to hold a collection of up to 2000 to 8000 songs. Some players (e.g., the Apple iPod) auto-synchronize with the PC by plugging into a high rate interface cable. The PhatBox player, intended for installation in automobiles has a removable hard disk cartridge, that attaches to a PC cradle (USB 2.0 cable) for content management. The user's collection and the creation of user playlists are managed on the PC via interactive windows based software.

Another emerging technology is user customized radio via streaming across the internet, such as Yahoo LaunchCast. An automatically generated sequence of songs, custom selected based on the user's profile, is generated remotely at the service providers server. The stream is forwarded to the user across the internet to a player application located on the user's PC. Each user creates a unique profile using an interactive windows application on the PC in-order to select music categories and artists the user likes. The user also may provide additional profile feedback, while a composition is playing or by accessing the user's library, to rate each song, album and artist on a rating scale. A major disadvantage of LaunchCast is that there is no link between the user's radio profile information and the user's music collection [i.e., the user's usage-rights (e.g., listening-rights) to particular compositions]. Because there is no link with the user's listening rights, the LaunchCast user does not have the ability to go "backward" or to repeat a song or cause a particular song to played. If the user wishes to add a composition that is playing to their collection, they are only provided with a link to a web page where the CD may be purchased. A disadvantage of streaming is the skipping or jumps that occur if the continuous virtual bandwidth is interrupted by other network traffic. Another disadvantage of streaming is its limited tolerance to insufficient network latency, which can result in delays in the radio program, especially when the user decides to "forward" or "skip" over the currently playing song.

Other interactive internet based streaming services allow the user to create a custom playlist or multiple playlists of favorites, by selecting each song to include from a catalog of compositions provided by the service. A major limitation is that the user must be familiar enough with the composition to be able to identify the artist, album and song by name. In addition, the user must expend considerable effort to manually locate each song within the catalog of songs in the provider's database or the user's library, by typically either reading through an alphabetical list of songs by genre, artist, album or performing a search for each song by using a search tool. The user must continually and manually update all this as their musical tastes change over time. To generate a stream of songs, the user may then have to choose a group or order of particular songs to form a user's custom playlist. Another limitation is that the user does not own the music collection and does not own listening rights to the music. In addition, it is not integrated to other listening rights the user already has purchased.

In some internet services, the user may indicate the relative likeablity of each of the songs in their custom playlist. Typically, the user manually rates each composition based on a scale, such as 1 to 100. Which requires the user to manage in their mind the relative rankings of songs by rating number so one song has a higher number relative to another. In addition, the user must manually change their ratings and their playlists as their taste for songs changes over time. This typically requires a significant amount of visual interaction from the user, often with a PC windows based display, which is not suitable while driving an automobile or for many other activities.

More generally, the above discussion also applies to music videos, short films, movies, video programs, television, audio versions of books, talks, speeches, voice content, lectures, and any other type of composition. In some cases, the media formats will differ (DVD's or other formats instead of CD's), but the limitations discussed are generally applicable.

SUMMARY OF INVENTION

The objectives and advantages of this invention include:

Provide a simplified way providing a entertainment (e.g., music) experience that is customized for each user.

Allow the user to experience both different and new music, more easily and at a faster rate.

Simplify the process of finding and acquiring a larger variety of pleasing music for each user's collection.

Not require the user to identify and select compositions based upon knowledge of the artist's name, album name and composition name.

Simplify the purchase and delivery of music (and music videos) to create a user's collection.

Eliminate all user efforts and concerns with backing-up and storing their personal collection of music.

Preserve a user's profile, history and collection even if user devices are lost, stolen, broken or destroyed.

Eliminate user efforts of knowing, locating or converting different file formats for different devices and future devices.

Allow each user's profile, history and collection to be available to all the user's devices where ever they are located or used.

Eliminate all user efforts and concerns with transferring their personal collection of music between all the user's various devices.

Allow each user's profile, history and collection to be immediately available to any user device not previously used by the user (a new purchase, a friend's, . . . ).

Adapt to each individual user's control actions, representing real-time feedback of likes and dislikes of compositions while they are played.

Adapt to changing user tastes for music, such as when a user becomes tired of a given composition.

Utilize the prior experiences of other similar user's, to improve each user's experience.

Allow aggregate real-time information collected from the many users to influence decisions made by the experience providers, composition providers and composition creators.

Provide a simple and intuitive user interface that is similar to existing devices that users are already familiar with.

Allow users to share a favorite composition or their current list of favorites with each other.

Provide such a superior experience and ease of use (compared with pirated alternates) that user's will prefer to pay for such convenience.

BRIEF DESCRIPTION OF DRAWINGS

FIG. 5 illustrates an embodiment of a user history database.

FIG. 9 illustrates an embodiment of an Aggregate Common Likeability Database.

FIG. 10 illustrates an alternate embodiment of an Aggregate Common Likeability Database.

DETAILED DESCRIPTION

Distribution of Compositions

Figure 2:
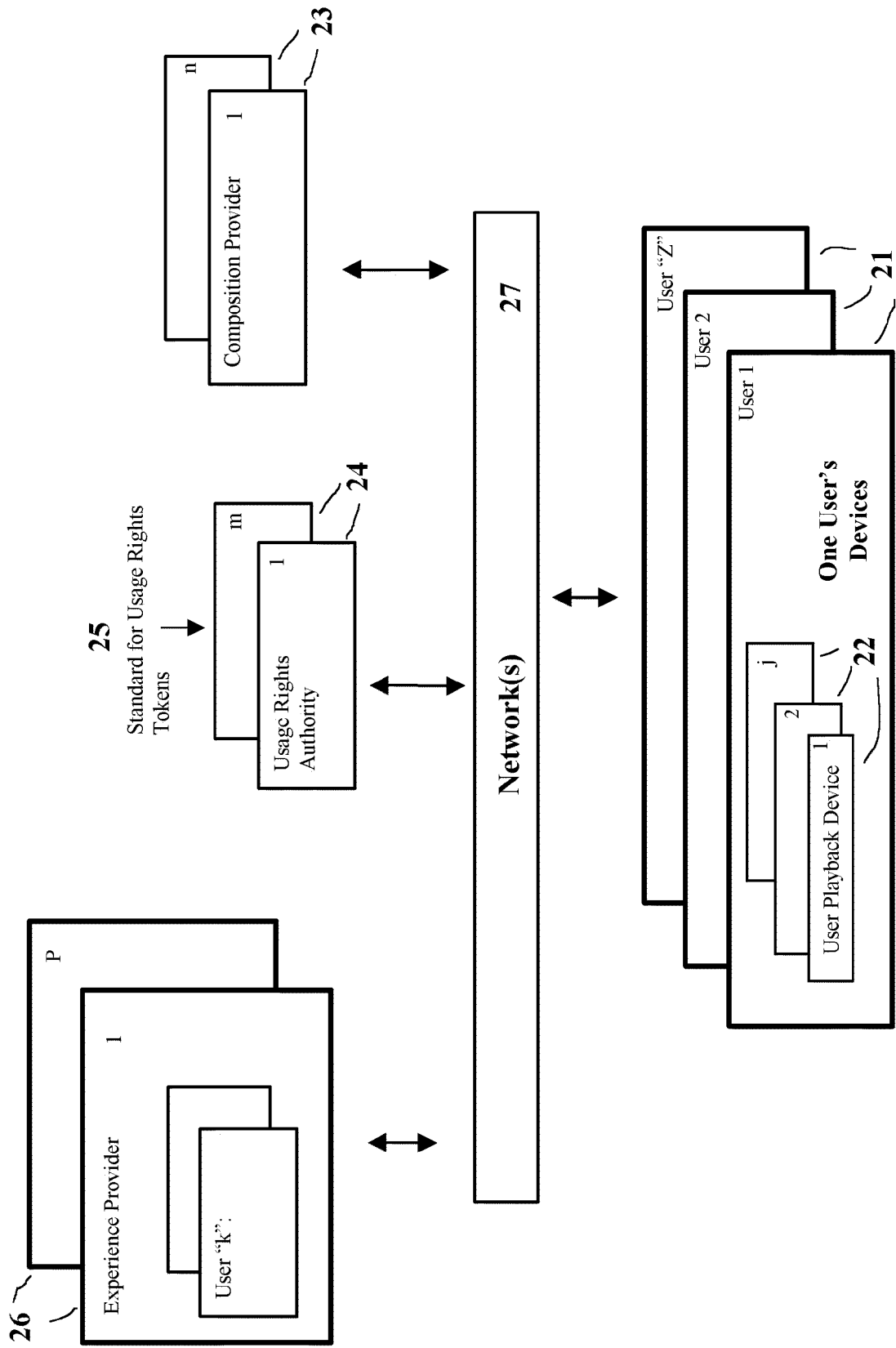
FIG. 2 illustrates the functional flow between user devices, experience providers and composition providers.

FIG. 2 illustrates the functional flow between user devices 21, composition providers 23, experience providers 26 and usage rights authorities 24 across one or more networks 27.

As shown in FIG. 2, there may be a plurality of possible users 21 (user1, user2, . . . , user"z"). Each user may operate one or more user playback devices 22 at different times and different locations. The devices a given user operates may be at many different locations, such as at home(s), work(s), automobile(s), portable(s), etc. User devices may also be incorporated into other products such as a cell phone, television or home entertainment system. The user devices may be mobile and portable. Some devices (i.e., a personal player) may be used by only a single individual user. Other devices (i.e., an automobile player) may be operated by different individuals at different times. The user devices may be manufactured by many different vendors. Any given user device may only be able to handle a limited number of the available composition formats.

There may be many composition providers 23 that each provide their own catalog of compositions for which they control the intellectual property rights. A composition provider may control the compositions for a single composition creation entity [i.e., the creative artist(s) or group] or many composition creation entities.

There may also be many different experience providers 26. An experience provider is responsible for providing the adaptive personalized entertainment sequence that is customized for each user and is integrated with the user's collection of compositions. The experience provider may automatically introduce the user to appropriate new compositions over time and automatically adopt the personalized program sequence as a user's tastes change. The experience provider automatically distributes the user's collection and also automatically collects and maintains the user's profile and history across all the user's devices. The user's collection is made available to any device the specific user is operating.

There may also be one or more usage rights authority 24. The usage right authority or authorities utilize a common "standard for usage rights tokens" 25 so that a user's collection of compositions, represented by the set of usage rights tokens a user acquires, may be recognized and usable with all experience providers. Each usage rights token is for use by only a specific individual user. The compositions in a user's collection may be easily transferred between and used with any of the experience providers. The listening rights authority may also maintain a database of all issued tokens so a user's collection (usage rights tokens) may be preserved even if all the devices of a user were to be lost or damaged.

Portions of the network(s) 27 may be wired or wireless. A wireless interface between user devices and the network may be preferred since the wireless connection may be established and maintained more automatically and with minimal user efforts.

Most users will typically utilize many different players at different locations throughout the day and from day-to-day such as in different rooms of the home, at different homes, at different work locations, in different automobiles, or various portable devices. In addition, there are many devices that the user may only temporarily use, such as devices located at a hotel, a rental home, a rental car, on loan from a friend, etc. It is desired that the user's history and profile be interoperable and automatically synchronized between all these devices so the user history collected at each device is available to all other user devices. An experience provider may automatically perform the required level of synchronization between all of the user's devices and storage locations on the network(s).

In one embodiment, the user history and user profile information is stored redundantly at multiple locations distributed across a network(s), such as the internet, so that the user's information has a high availability (even if some network nodes/paths are down) and is robustly protected from loss. Periodic back-up or archiving of the information may also be utilized to provide an additional protection against loss of the user's information. In one embodiment, this storage function is provided by the experience provider. Alternatively, a separate storage provider may provide storage, backup, archiving and protection of the user's history and library on the network. In-order to protect user privacy, user information stored on the network may be stored in an encrypted form for which the storage provider does not hold the decryption keys. Encryption mechanisms may be utilized to keep a user's history private and not accessible to human prying.

Experience Providers:

An experience provider is responsible for providing the adaptive personalized music (or entertainment) program that is customized for each user and is integrated with the user's collection of compositions. The experience provider may coordinate the following functions automatically without requiring any significant user action:

1) Provide a sequence of compositions, highlights and other material that is customized for each user based upon the prior history of user control actions and feedback.

2) Provide copies of compositions, highlights and other material to all user devices as needed.

3) Manage, store, backup and make available the user's collection so that it is available to all the user's devices. The user's collection may be represented by a set of user usage rights tokens.

4) Manage, store, backup and update the user's history (including control actions, feedback, play history, profile) across all the user's devices in-order to adapt to the user's changing tastes.

5) Recommend new compositions and highlights likely to be appealing to each specific user. Automatically incorporate the new compositions and highlights into the user's program sequence and the user's collection.

6) Provide pre-customized channels for each user (representing different categories, genre or moods of music) that may then be further optimized for each user based on user control actions and feedback.

7) Provide additional advertisements, news, or weather presentations in the user's program stream that are customized for each user based on user control actions, feedback or user profile.

8) Provide software updates for user devices.

9) Obtain usage rights for compositions that are made available to the user. Pay royalties to composition owners based on the user's usage.

10) Bill users for composition purchases, usage and other services.

11) Provide a "capture" mode capability to enable user's to identify and later experience and evaluate a composition they may be hearing from a non-user device.

12) Provide a "share" mode capability to enable a user to share a list of compositions with other users.

Although all of the above functions may be performed by the user's experience provider, they may performed by separate entities that are under the coordination of the user's experience provider. It is desirable that the user have many experience providers to choose between and to be able to easily switch (with low switching costs) from one experience provider to another.

It is desirable that the user's collection be easily transferable between experience providers. This may be accomplished with user usage-rights tokens that are issued by one or more listening right authorities that are universally recognized by all experience providers. This eliminates problems with tokens issued by each experience provider but which are not recognized by other experience providers and hence are not transferable.

The experience provider's costs for the library storage and management functions may be effectively amortized across a large number of users. All transfers of information between the experience providers repository (or depository) and the user devices may occur automatically without requiring any user knowledge or action. Concurrency of user data in the currently active user device(s) and the repository occurs automatically across the network without the user needing to be aware of it or taking any action.

Prior to a device shutting down, all the latest user feedback and user history may be forwarded to the network repository for later use by other user devices. The device's user display may optionally include an indicator, that is activated during device shutdown, to indicate whether concurrency with the repository has been completed. Optionally, the device may include an automatic capability of periodically trying to establish a network connection for upload in-order to complete concurrency with the repository prior to concluding shutdown.

It is desirable that user devices be able to operate with intermittent or temporarily unavailable network connections. When a network connection is not available, the user device may utilize compositions and highlights that were previously transferred to the local storage in the device. New highlights and new compositions may be limited to what was locally stored during previous network connections. In addition, timely information such as news and weather may not be available when the network connection is lost.

News, weather, traffic, etc may also be customized for the user based upon factors such as the day of week, time of day, or the location of user. Customization of weather and traffic reports to the day of week and time of day. Reports may be automatically adapted to the current physical location of the user.

Since the entertainment program is customized for each user, typically only one user program needs to be active at any one time. In some cases, the user may want the same program to be available at multiple locations, such as in multiple rooms in a house. The experience provider may impose limitations on the number of simultaneously active user devices and/or the maximum physical separation of devices that may be simultaneously active. The experience provider may monitor for violations which may indicate piracy or identity theft by examining the user history.

Figure 3:
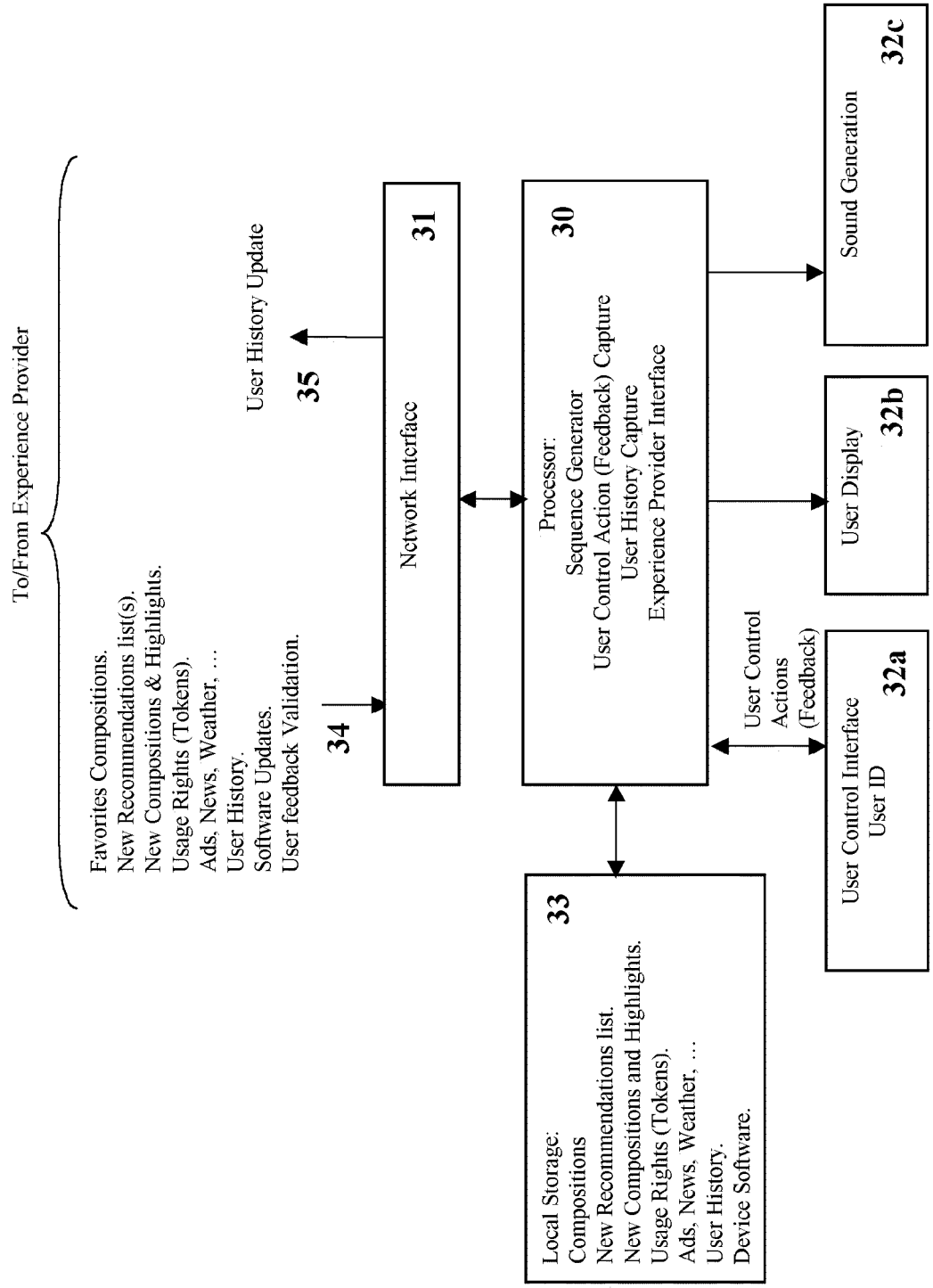
FIG. 3 is a functional diagram of a personalized music player.

User Device:

FIG. 3 is a functional diagram of a user device for generating an adaptable personalized entertainment experience. The user device includes a "user control interface" 32a for accepting user control actions and for determining the individual user (and user ID). The user device may include a "user display" 32b for presenting visual information for the current composition or device status. The user device also includes "sound generation" capabilities 32c or an interface to an external sound generation apparatus so the user may hear the customized sequence of compositions and other program information. The user device includes storage 33 to hold information locally that may include: 1) Compositions. 2) New recommendations list(s). 3) New compositions and highlights. 4) Usage rights (tokens). 5) Advertisements, news and/or weather. 6) User history 7) Device software and updates.

The "network interface" 31 receives information 34 from the experience provider and sends information 35 to the experience provider. Most transfers to and from the experience provider occur automatically without requiring the user to specifically initiate them. Information received 34 may include: 1) Favorite compositions. 2) New recommendations list(s). 3) New compositions and highlights. 4) Usage-rights tokens. 5) Ads, news and weather. 6) User history. 7) Software updates. 8) User feedback validation. Information sent 35 to the experience provider may include the user's history and updates to the user's history. User history and updates to user history may include: 1) User profile information. 2) User control actions. 3) User feedback. 4) User playback history. 5) User content restrictions.

The user device also includes a processor 30. The processor performs the user functions such as 1) Sequence Generation. 2) User control action (feedback) capture. 3) User history capture and update. 4) Experience provider interface transfers.

User Usage-Rights:

Rather than ownership of physical media, a user's collection may be defined by a set of tokens that define the usage-rights owned by one specific user. A usage-rights token may hold the usage-rights (e.g., listening rights for musical compositions) for a specific individual user for a specific composition. Since the tokens are electronic, the usage-rights tokens may be easily shared or distributed to all devices that the specific user owns and/or uses. This allows the user's collection to be automatically available anywhere the user is. If desired, a usage-rights token may control a user's usage-rights for a group of compositions, such as all the compositions on an artist's album.

Over time, a user may purchase various usage-rights to particular compositions to form their collection. Such rights may be for a limited number of plays, unlimited number of plays by the user within a certain time frame, etc for a given composition.

The usage-rights may extend for any period of time (start/stop time) or for the user's lifetime or perhaps perpetual rights that may be transferred to another user. The usage-rights may be limited to a certain number of plays or may be for an unlimited number of plays. The usage-rights may be limited to certain format(s) or may be valid for all formats available. The usage-rights may also extend to future formats that may become available due to technology advancement. The usage-rights tokens may be upgradeable, when desired by the user, to expanded usage-rights. Ideally, the tokens are recognizable by all user devices. Based on normal user control actions, new tokens may be automatically purchased or acquired on behalf of the user and added to the user's collection.

Figure 12:
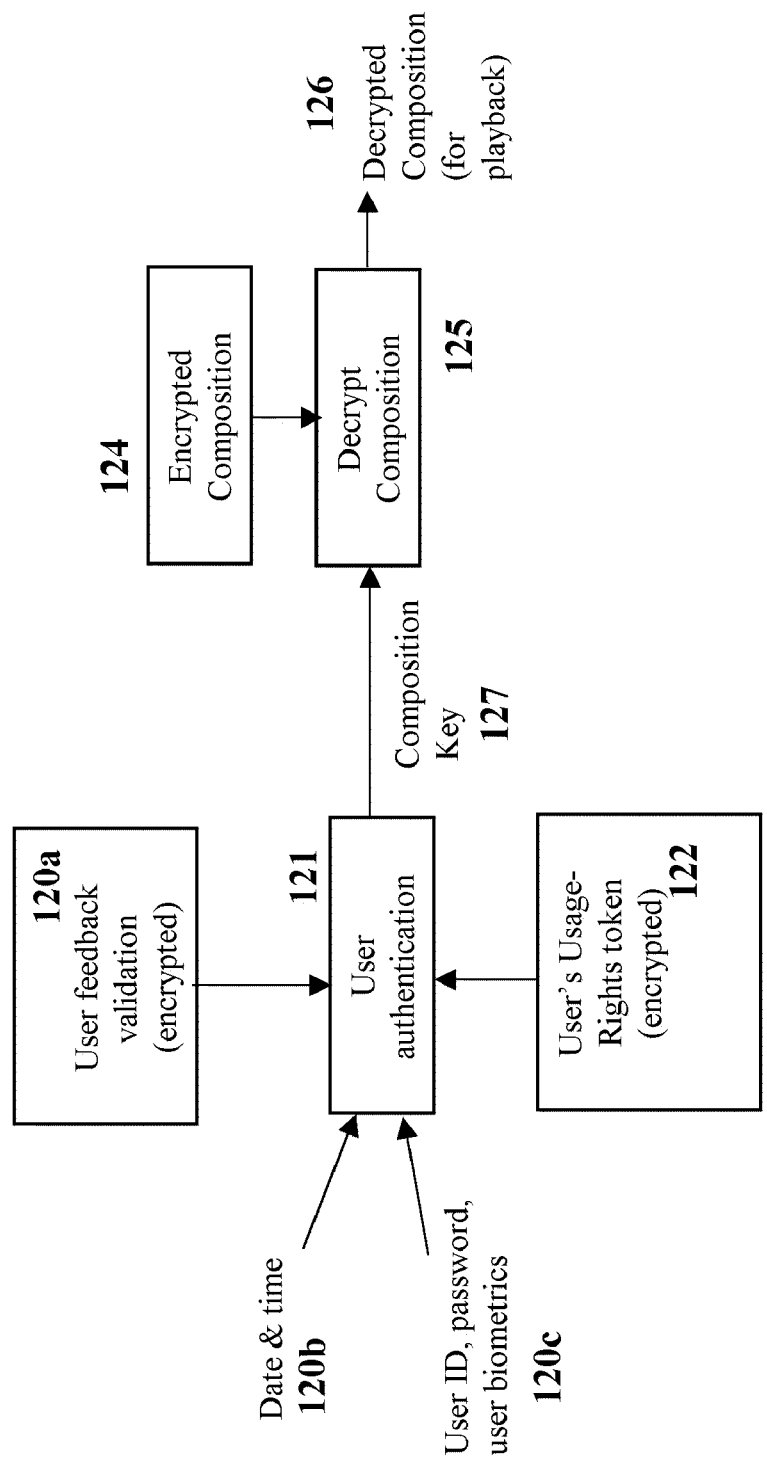
FIG. 12 is function diagram of an embodiment of the user usage rights management.

The usage-rights token may be separate from the composition. As shown in FIG. 12, the compositions are delivered and stored in an encrypted form 124. The encrypted token 122 along with user ID/password/biometric information 120*c*, date/time 120*b* and "user feedback validation" information 120*a* may be used to decrypt the composition key. The composition key 127 is then used to decrypt the composition 125 to generate the decrypted composition 126 for playback to the user. The "user feedback validation" 120*a* may be encrypted and represent a validation that the user has provided regular and consistent usage and history feedback to the experience provider. If appropriate user feedback is not received from user device(s), the "user feedback validation" 120*a* may lockout usage of that device(s) until such expected feedback is re-established. The "user feedback validation" 120*a* may also include date and time information to check against improper settings of the local clock. The "feedback validation" 120*a* may be used to inhibit user ID piracy or inhibit multiple users from using a single user ID by preventing an excessive number of user devices from being simultaneously operated in widely different physical locations.

User's may exchange their previously purchased physical media such as a CD for usage-rights token(s). The tokens may also be optionally transferable between users to allow the transfer of any portion of one user's collection to another individual or upon the user's death. To control piracy from extremely short-term exchanges, a limitation on the time between such transfers may be imposed.

Users want the ability to switch experience providers and to be able to easily take their listening-rights tokens with them from one experience provider to another. Hence, it is desirable that the user's usage-rights tokens be recognized by all experience providers. The usage-rights authority 24 is responsible for imposing a "standard for usage-rights tokens" 25 that allow them to be portable to all experience providers. The usage-rights tokens may be issued by a usage-rights authority (authorities) 24 that are independent of but recognized by all experience providers. This allows a user's usage-rights tokens to be usable with all experience providers.

The usage-rights authority obtains issuing rights from the owners of each composition. A secure database of all issued tokens may be maintained by the token issuing rights authority. The tokens may be distributed for use at any or all the user's devices and with all experience providers. To eliminate user concerns about the loss of their tokens (representing their collection), a user's complete collection of tokens may be recovered by the issuing authority by accessing the token database. The user's collection of tokens may be robustly preserved against loss by distributing multiple copies at different physical locations across a world-wide network and periodically backed-up and archived on the network. In this manner, a users collection may be robustly preserved no matter what happens to any or all of a user's physical playback devices. It is preferred that the preservation of user tokens be provided automatically by a usage-rights authority, an experience provider or a storage provider without requiring user efforts.

The individual user's collection of compositions is represented by a collection of the listening right tokens. Ideally, the management and handling of the tokens occurs automatically by the playback devices and does not require user action or knowledge. The experience provider may automatically manage and backup copies of the user's tokens in-order to eliminate user's concerns about loss of their collection.

If desired, copies of the tokens may also be kept by users in a physical hardcopy form but this is not preferred since the user must store and organize such physical entities and they must be convertible back into electronic tokens.

Identifying the Specific User:

Each user device must determine the specific user that the entertainment program will be customized for. In one embodiment, each time the device is re-started or powered-up the user may be re-determined so that multiple users may intermittently share the same device, yet experience a customized program. Voice recognition of the user's voice or a unique verbal identifier or some combination of both may be used. Other possibilities include the recognition of the user via a camera image taken at startup, or various bio-metric sensing of the user such as fingerprint sensor on the "on" control or other device controls. The same input microphone may be used for both voice recognition and for the optional "capture" mode (discussed in a later section). The device may also keep a list of prior user's so the identification process may be defaulted or biased toward the most recent user(s). For devices that are typically used by only a single user, the user identity may be configured on initial use and not reconfigured unless a reconfiguration is specifically requested by the user. It is preferred that the user identification process require minimal or no specific user actions.

Accuracy in identification of the user is important to prevent corruption of both the user's usage-rights and user history due to user identity errors, piracy or identity theft. Additionally, since the user's history and usage-rights are of considerable value to each user, user "identity theft" should be protected against. Methods for identity recovery may be employed, so a user's history may be restored to the state just prior to the occurrence of an identity theft. Software may be utilized by the experience providers to monitor for unusual behaviors that are indicative of identity theft.

It is desirable to create a user experience so that it is in the user's interest to correctly identify themselves to the "system" and to protect themselves against identity theft or the loaning of their identity to others. User's will realize that the use of their identity by others, will corrupt their user feedback history and compromise their customized program experience. By providing a customized experience and continually providing new compositions that are of high value to the user, users will be naturally compelled to correctly identify themselves and avoid loaning their identity to others.

Besides the everyday user ID, a more hidden and secured user identity may be maintained by the "system". This allows the user to re-establish a new everyday ID if their everyday user ID becomes compromised.

User Interface:

The personalized player may be controlled by the user via numerous types of user interfaces including voice activated, manual controls, touch screens, interactive displays, remote control devices, etc.

Figure 4:
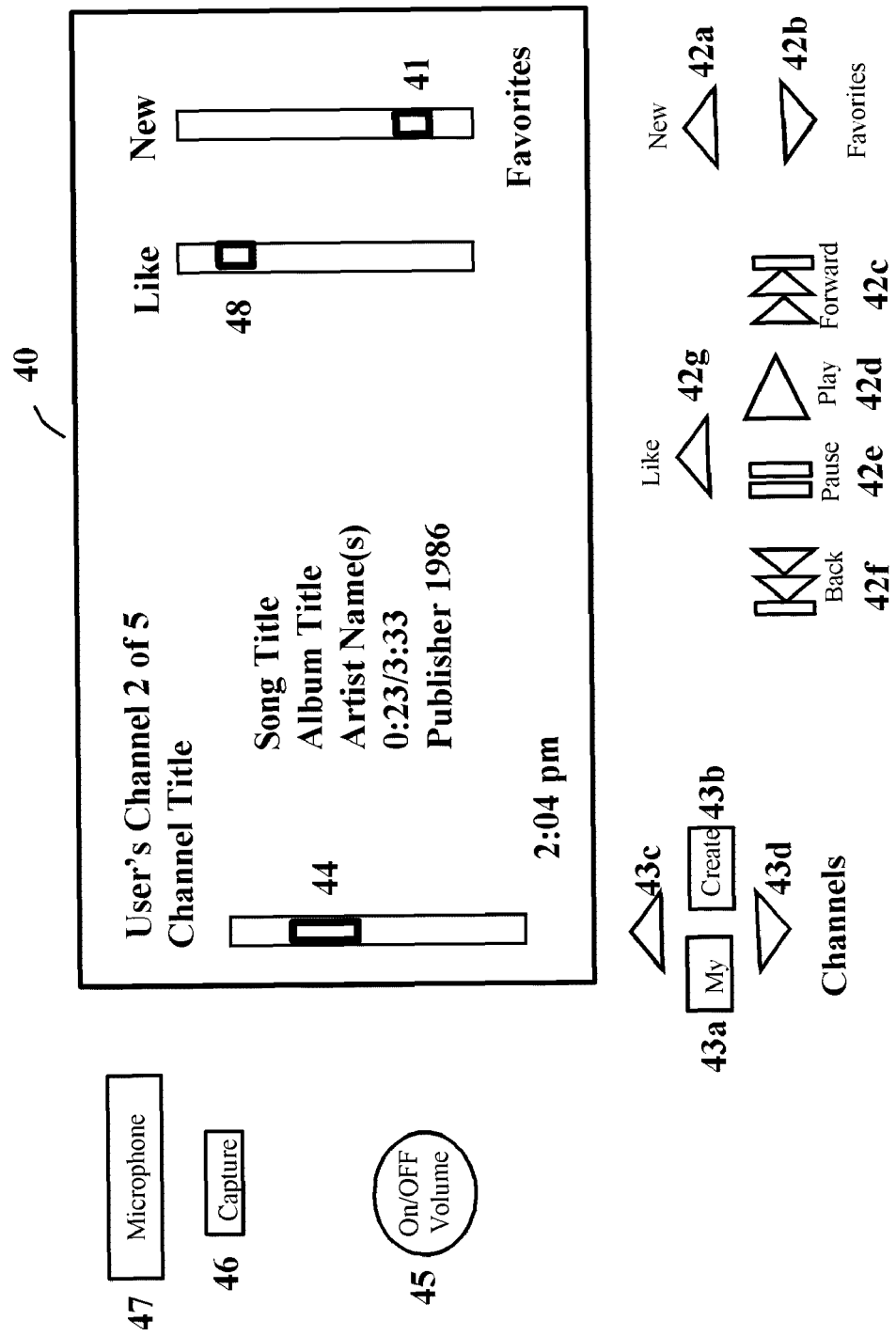
FIG. 4 illustrates an embodiment of a user interface for a user device with manual controls.

FIG. 4 shows an example of a manual user interface for use where the user is within reach of the controls such as with a portable player, a remote control, or a player located in a automobile within reach of the driver. Such controls may be implemented with electrical-mechanical controls such as push buttons, switches, sliders and knobs or with interactive touch screen control. In another embodiment, the controls of FIG. 4 may also be accomplished with voice commands.

The "Favorites-New" slider 41 is used to vary the percentage of new compositions that the user will hear. When the slider is at the "favorites" position (lowermost position) all compositions are selected among those most highly liked by the user. When the slider is positioned at the "new" position (uppermost position) the user is only exposed to new compositions he or she is not familiar with. The user may adjust the "Favorites-New" slider position by activating (pressing) the "New" 42a and "Favorites" 42b controls or in an alternative embodiment by dragging the slider indicator 41 upward or downward. As the slider 41 is positioned further away from "favorites" and closer to "new", the user will hear a greater percentage of new compositions and a lower percentage of favorites.

In another variation, highlight-snippets may be inserted at increasing frequency as the position of the "Favorites-New" slider is closer to the "new" position.

As shown in FIG. 4, the device may include a display 40 to indicate information about the selected channel, composition being played (artist, title, etc), playtime, device status, etc. The device may also include typical user controls such as "pause" 42e, "play" 42d, "forward" (or "skip") 42c, "back" 42f, and channel controls (43a, 43b, 43c and 43d).

In another optional enhancement, when a sequence of user commands indicate user difficulty or frustration, the device may issue recommendations to the user on how to better utilize the device's capabilities. Such recommendations might be issued by voice synthesis or on the device display.

Capturing and Utilizing User Control Actions:

The user's control actions (control history) from a user's various devices may be captured as user feedback about the compositions heard by the user. The user control history (feedback history) may then be utilized as input for the ranking of compositions by likeability and for the creation of a customized composition sequence (or entertainment program) for each individual user.

User feedback about each composition when it is playing may be obtained based on the user's usage of the "back" 42f and "forward" 42c ("skip") controls (or the equivalent voice controls). For example, a user's composition rating may be increased, whenever the user uses the "back" 42f control (or a series of "back" controls) to request that a recently played composition be repeated. For example, if the user uses the "back" control to immediately request that the currently playing composition be repeated, the user rating for that composition is significantly increased. Similarly, if the user uses a series of "back" controls to request that a recently played composition be replayed, then the user rating of the requested composition is significantly increased. If the user requests that a composition be played after searching for the composition in the user's favorites list, the user rating for that composition may be increased. If the user requests that a specific composition be played, the user rating for that composition may be increased.

Similarly, a user's composition rating is decreased, whenever the user uses the "forward" control 42c to request that the rest of a currently playing composition is to be skipped. The amount the user's composition rating is decreased may be dependent on how much of the composition has played before the user activates (presses) the "forward" control. For example, the rating may be decreased a smaller amount if the user skips forward near the end of a composition playback. The rating may be decreased a larger amount if the user skips "forward" near the beginning of the composition playback.

A user's composition rating may be changed by the "forward" or "back" controls, only when the composition has played for a long enough time for the user to recognize it (i.e., the playback time has exceeded a recognition threshold time). For example, if the user hits the "back" or "forward" control so quickly in a sequence that there is not enough time for the intermediate compositions to start playing and be heard by the user, then the ratings of the intermediately bypassed compositions may not be affected.

An additional method for indicating positive user feedback may be accomplished by a single action by the user, such as activating a single control (if manually controlled) or the speaking a single word (if voice controlled). For a player with manual controls such as in FIG. 4, a single control switch called "Like" 42g (or another suitable name) may be pressed by the user while a composition is playing in-order to indicate a desire that the composition be played more frequently. Optionally, different amounts of "like" may be indicated by the number of times the user activates (presses) the "Like" control 42g while the composition is playing. For example, if the user activates (presses) the "Like" control multiple times while a composition is playing, the user rating for that composition (and the frequency that the composition is played) would be significantly increased. Alternatively, the "Play" control 42d may be used (instead of the separate "Like" control) to indicate a user desire for the currently playing composition to be played more frequently. The user may activate the "Play" control one or more times to indicate a desire to hear the currently playing composition more frequently. The variation/distribution in the number of multiple "Like" pushes typical for a given user may be used to calibrate the appropriate adjustment of the user's composition rating versus number of "Like" pushes. Such calibrations may be adjusted over time so that the rating change associated with each different number of "Like" pushes, may adopt to each user over time.

Similarly, a compositions rating may be increased when a composition "highlight" segment is playing and the user hits the "Play" control 42*d*, in-order to immediately hear the full composition.

Although, a "dislike" control (or voice command) may be similarly utilized to indicate a negative feedback, it may not be needed since use of the "forward" (skip) control while a composition is playing, is itself a sufficient indicator of "dislike".

Figure 7C:
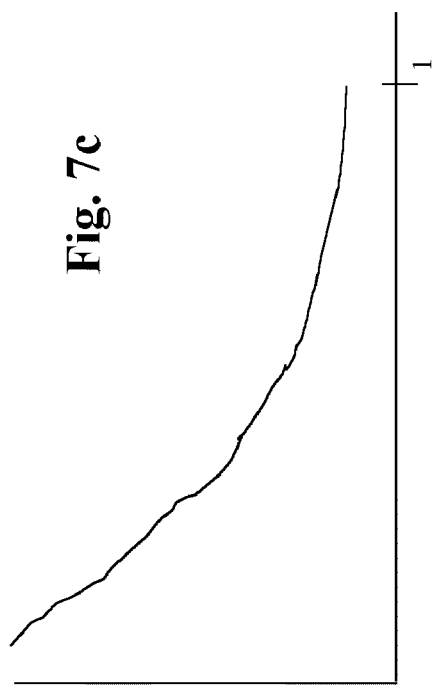
FIG. 7*c* illustrates a typical graph of "time between plays" versus "(current enjoyment)/(peak enjoyment)".
Figure 7A:
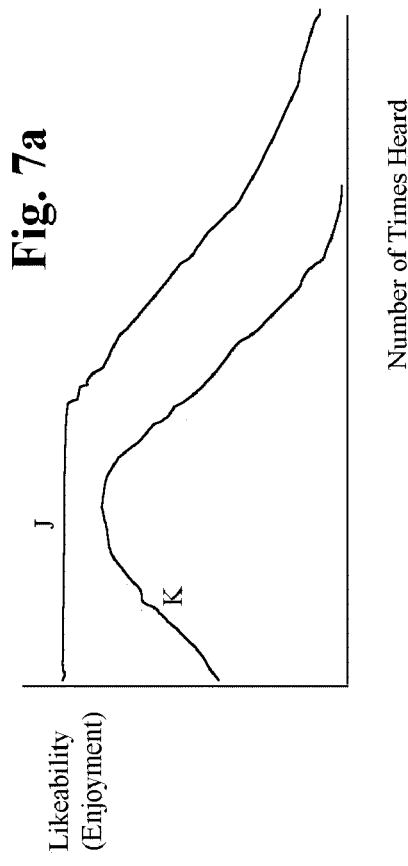
FIG. 7*a* illustrates typical graphs of "user likeability or enjoyment" versus the "number of times heard".

Even if the user does not provide any feedback on a composition during a playback, the user's rating may be automatically adjusted lower (or higher) based on an estimated change in likeability as a function of the number of times heard by the user. FIG. 7*a* show examples of likeability of a composition as a function of "number of times heard". The data illustrated by these curves may be generated based upon the aggregate feedback to the composition from other users considered similar to the user. Curve J in FIG. 7*a*, is an example of a high initial likeability for many playbacks followed by an eventual decline in likeability. Curve K in FIG. 7*a*, is an example of medium high initial likeability followed by an initial increase in likeability with times played, then followed by an eventual decline in likeability from the peak likeability. Although curves are shown for illustration purposes, the actual embodiment, may utilize look-up tables, databases, functions, equations, etc.

If the user has had a lot of recent forwards (skips) over prior favorite compositions, the favorites-new setting 41 may be automatically adjusted more towards the "new" mode so that the user is exposed to a larger number of new compositions. In this case, the favorites-new indicator (41 in FIG. 4) may be automatically adjusted to be closer to the "new" position.

By utilizing the normal user control actions as feedback on each currently playing composition, the users rating automatically adapts to the user's evolving preferences and tastes over time without requiring special actions by the user to specifically rate compositions. A user's composition rating may be re-adjusted each time a composition is played or selected, so the rating adapts gradually and automatically. User feedback on each composition while it is playing occurs automatically based on the user's normal control actions.

The user does not need to know the artist, title or anything about the composition, only whether he or she likes what is currently playing. The user does not need to take special action to rate compositions on a rating scale. The user also does not need to be aware of a rating number system (e.g., 1 to 100) or adjusting the relative number rating of one composition versus another and to manually re-adjust such ratings as the user's tastes change over time. The user is not required to navigate a set of windows or menus to rate the composition. The user is not required to manually select from a catalog of compositions in-order to create composition playlist(s).

Figure 1:
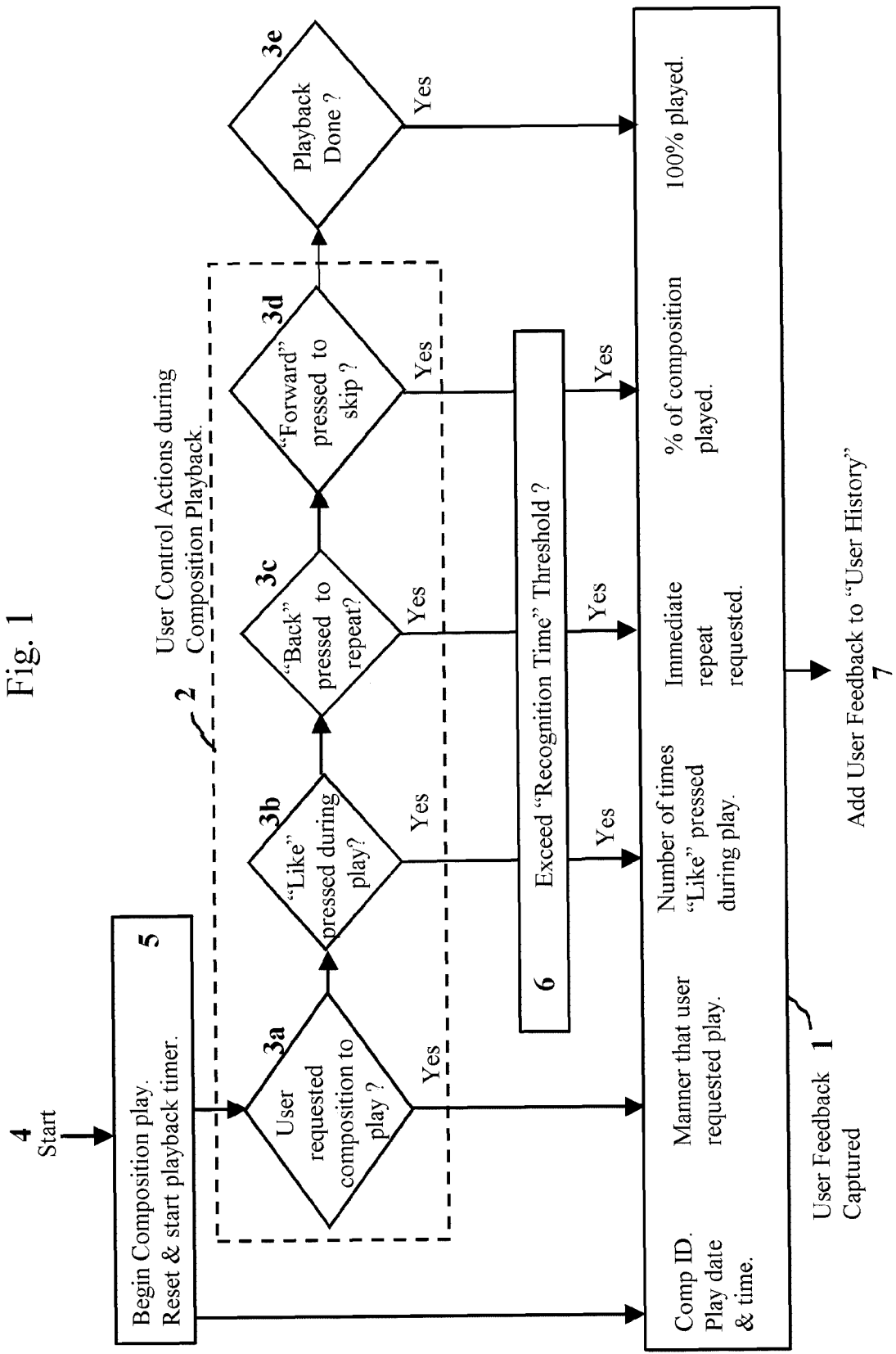
FIG. 1 illustrates the capture of user control actions representing user feedback about a currently playing composition.

FIG. 1 illustrates the capture of user control actions representing user feedback about a currently playing composition. "Start" 4 occurs with the "Begin composition Play" and the "Reset and start of the playback timer" 7. The playback timer records how long each composition has been playing. When the user control action (while the composition is playing) is a "Forward" pressed to skip" 3*d* (i.e., stop currently playing composition and go to next one), the timer may be used to determine the percentage of the composition that was played, which may be representative of the amount of user dislike for the composition (a negative feedback). Typically, the lower the percentage that a composition was played through, the greater the user dislike for the composition. When the user control action is a "Back" pressed to repeat" 3*c* (while the composition is playing or has just finished), an "Immediate repeat request" (a positive feedback) is generated for the composition. When the user control action is a "Like" pressed during play" 3*b*, the number of times the "Like" was pressed during composition playback (a positive feedback) is captured for the composition. If the user took specific action(s) to play the composition, such as "User requested composition to play" 3*a* (a positive feedback), the manner that the user requested play is captured. For example, the user may have searched his favorites to request that the specific composition be played. When a complete playback has occurred 3*e*, a "100% played" is captured as user feedback.

Note that the composition playback may be required to have played for at least a "Recognition Time" threshold 6 before certain user control actions are captured. The "Recognition Time" threshold represents the minimum amount of time that a composition must have played in-order for a user to hear it and form an opinion. The threshold may be used to filter out user control actions that occur too soon after a composition starts playing, to be true feedback about the composition. When a composition playback begins, the composition ID, date and time may also be captured. Note that there are many "user control actions during composition playback" 2 that may generate "User Feedback" 1. The "User Feedback" 1 is then "added to the User History" 7.

Figure 6:
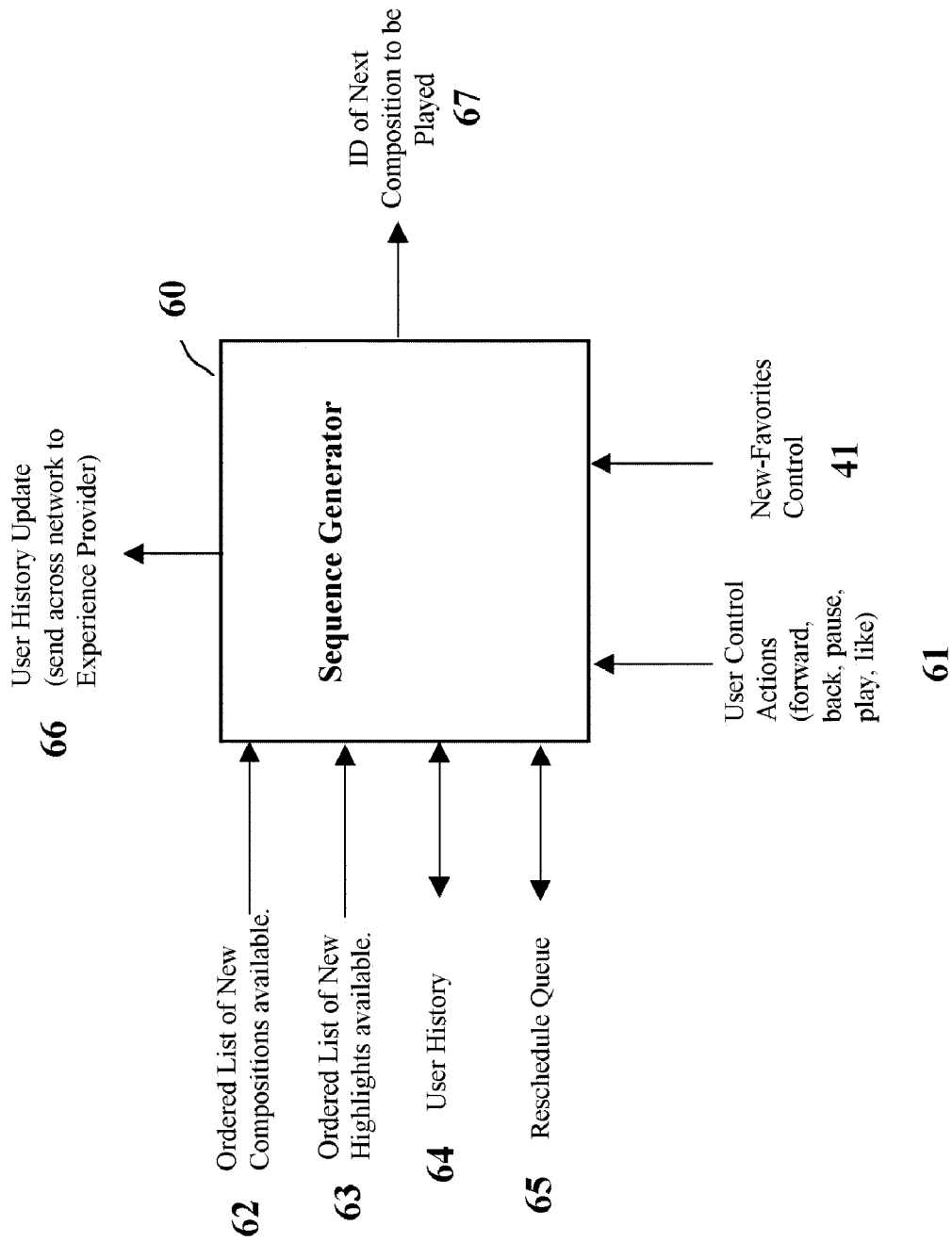
FIG. 6 illustrates the functional flow of a Real-time Sequence Generator.

Composition Sequence Generation:

FIG. 6 is a functional diagram of a real-time sequence generator 60. The sequence generator operates in real-time in-order to immediately respond to user control actions 61 such as "forward", "back", "pause", "play". The sequence generator is able to automatically transition between immediately responding to user control actions and automatically generating a customized sequence of compositions (entertainment program) for the user.

The sequence generator may automatically enter the customized program mode whenever all prior user control requests have been completed and the user is not currently providing control actions to affect the composition sequence.

When in the customized program mode, a primary determinate for the "ID of the next composition to be played" 67 is the position (setting) of the "Favorites-New" control 41. When in the favorites position, compositions are chosen based on the likeability ratings of compositions based in the "user's history" 64. If the user's list of favorites is short, then it may be necessary that new (to the user) compositions and highlights may be interspersed with the user's favorites to provide sufficient composition variety and to allow automatic expansion of the user's list of favorites (or collection).

Figure 7B:
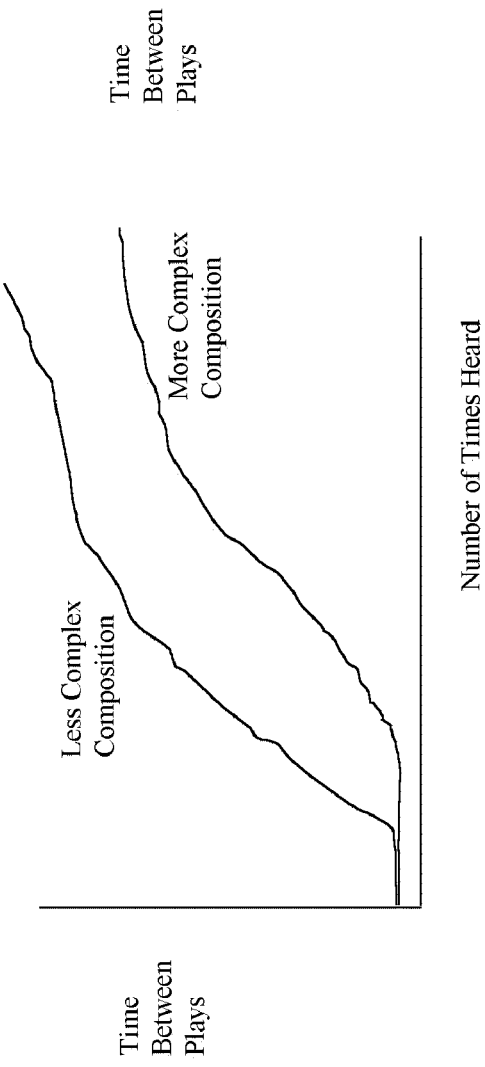
FIG. 7*b* illustrates typical graphs of "time between plays" versus the "number of times heard".

The time between the playback of user favorites may be determined as a function of the "number of times heard". FIG. 7*b* shows example curves of "time between plays" versus "number of times heard" and the psychological "complexity of the composition". When a composition is new to the user (and the user has indicated positive feedback) the time between plays is shorter. Eventually, as user likeability decreases with familiarity, the time between plays is increased. The user may tire of compositions with a lower psychological "complexity" more quickly than those with a greater psychological "complexity". The likeability functions may be constructed based on aggregate user feedback of users that are considered similar to the user.

Alternatively, the "time between plays" may be determined or influenced by the ratio of "current likeability divided by peak likeability". As the example in FIG. 7c shows, the "time between plays" may increase as the "current likeability" decreases relative to "peak likeability". A reschedule queue 65 may be used to hold the user's favorites ordered by their next playback time.

It may also be useful to define different types of "time between plays". First, there may be a "no more than X time between plays" for new compositions that the user has indicated significant positive feedback and hence wishes to hear frequently. Second, there may be a "at least X time or greater between plays" for older favorites that the user still likes somewhat but no longer wants to hear as often.

Although curves are showed in FIGS. 7a, 7b and 7c for illustration purposes, actual implementations may utilize methods such as lookup tables or equations/functions where the coefficients/parameters are determined by fitting to the data within an acceptable error.

An ordered list of the locally available new compositions 62 and an ordered list of the locally available highlights 63 may be used to determined the order they are presented to the user or interspersed with the user's favorites. When the sequence generator has decided to playback a new composition or highlight, the next one on these lists is played. The selection of the compositions on these lists and their order on these lists may be determined as described in the section entitled "Selection of New Compositions and Highlights". Only compositions for which the user has usage-rights and that are immediately available locally are included on this list. Some composition providers may allow a certain number of free plays for a user in the hopes that the composition will become a user favorite and be purchased and added to the user's collection.

The sequence generator 60 maintains a record of the "user history" 64 locally which is updated with all the user's control actions and the history of composition playback. When scheduled and when network connectivity is available, the sequence generator 60 provides "user history updates" 66 back to the experience provider. The update may only include new [and may exclude previously forwarded] user history information.

An example of the "user history" 64 data elements is shown in FIG. 5. Shown at the top of each column in FIG. 5, are parameters that may be captured for each composition the user has heard. The parameters maintained for each composition may include the following: 1) A unique "composition number (Comp #) used to identify each composition. 2) The user's usage-rights token for each composition. 3) Whether the composition is available locally. 4) The user's current enjoyment rating. 5) The user's peak enjoyment rating. 6) The number of times the composition was heard. 7) The play history including the date/time when the composition was last heard. 8) The target time between playbacks. 9) The user feedback history representing the positive and negative user control actions related to the composition. 10) The likeability curves, equations or functions that apply to the composition which may be identified by a pointer, filename or other identifier.

It is preferred that the sequence generator 60 be implemented as a plug-in software module, so that continually improved versions may be created by the experience providers or sequence generator providers.

Using "Highlight" Segments to Introduce New Compositions:

Including highlights (i.e., composition samples) in the customized entertainment sequence is an optional enhancement of the invention. It allows the user to more quickly discover pleasing compositions that are "new" to the user. "New" to the user means compositions that the user has not yet heard or is not yet sufficiently familiar with. This would include compositions that have been available for many years but the specific user has not yet experienced. It also includes those compositions that have been recently released but the specific user a limited familiarity with. A composition may be "new" to the user even though was released years or decades ago. Highlights may be interspersed with full compositions in the customized entertainment sequence. New highlights are custom selected for each user based upon the probable likeability (enjoyment) as estimated from the user's history and profile.

Each highlight-snippet (i.e., composition sample) is an approximately 10 to 20 second cut (sound segment) of a highly compelling part (or parts) of a composition. The most compelling part(s) of a composition will typically be manually pre-selected by an artist, expert, focus groups or based on aggregate user feedback. Assuming an average composition duration of a little over 3 minutes, the use of highlights may increase the user's discovery of new music by a factor of about 10 to 20 times. The highlight-snippet (sound segment) may utilize a storage format similar to any other composition (only they are of shorter length). A highlight snippet may be free for a limited or unlimited number of plays by a user. An audio or visual indicator may be utilized to distinguish between a highlight and a full composition.

Highlights may be interspersed with user favorites and new compositions based upon the "favorites-new" control (slider) 41 setting. Highlights may be interspersed more frequently, the closer the "favorites-new" control 41 is to the "new" position.

In one variation of the invention, when the slider 41 is in an extreme newness position (uppermost position), the device will enter the highlights-mode where the user will hear a sequence of composition highlights so that the user is exposed to a larger number of compositions in a shorter period of time. The highlights-mode allows each user to discover new pleasing music and to expand their collection of compositions at a higher rate.

Typical user control actions may be captured as user history (feedback) while each highlight is being played. This may include skipping ("Forward") when the user dislikes the highlight (indicating negative feedback) or jumping backward ("Back") if the user wishes to hear the highlight again (indicating positive feedback) or activating (pressing) the "like" control (indicating positive feedback). While the highlight is playing, the user may activate (press) the "Play" control to immediately hear the full composition (also indicating positive feedback). After the full composition has finished (and the user has not provided other control actions), the "highlights" mode may resume playing other highlights.

When the user indicates sufficient positive feedback, while a highlight is playing, the composition may be added to the user's list of favorites or potential favorites. When the user indicates sufficient negative feedback while a highlight is playing (such as forwarding past it), that highlight (and "similar type" highlights) may be less likely to be presented to the user. If the user does not provide any feedback or a weak feedback, while a highlight is playing, that highlight may be presented to the user for reconsideration (and user feedback) at a later time.

Since the user might activate a control in error, the user ratings of a composition should not be excessively effected by a single user control action. Rather the user ratings for a composition may be gradually changed based upon feedback from multiple exposures to the composition over a period of time. For example, it may take several playbacks of a composition over a extensive period of time, in which a "Forward" (skip) was consistently activated early during the composition playback (and there was no other positive feedback), in-order for the user's rating of that composition to become so negative that it would not be presented to the user again.

When the user's list of favorites is too small to generate a sequence with an acceptable time between replays of the user's favorites, the sequence generator may intersperse more new compositions and/or highlights between the user favorites. In this manner, a user's list or collection of favorites may be naturally expanded, when required, without requiring any special user actions to search for and locate the new compositions.

When the sequence generator is in the favorites mode and the user appears to be disliking and forwarding over much of the music, the device may recommend that the user move toward the "new" position on the "Favorites-New" slider 41. Alternatively, the slider 41 may be automatically moved toward the new position so the user will be exposed to more new compositions that are likely to be pleasing to the user. In addition, an increased number of new highlights may be automatically interspersed by the sequence generator.

The user device may include a mechanism for the user to approve the acquisition or purchase of a new composition(s) or the usage-rights for a new composition(s). For example, the device display may display information about the new composition such as its purchase price and purchase terms while the composition or its highlight is playing. Or such information may be communicated to the user by audio prior to or following the playback of the composition or highlight. A sale or bargain price may be offered to the user. To confirm a purchase, the user may take control action such as activating a certain control or perhaps speaking a certain word or phrase. Of course, some purchase plans may not require approval of each purchase.

Figure 8:
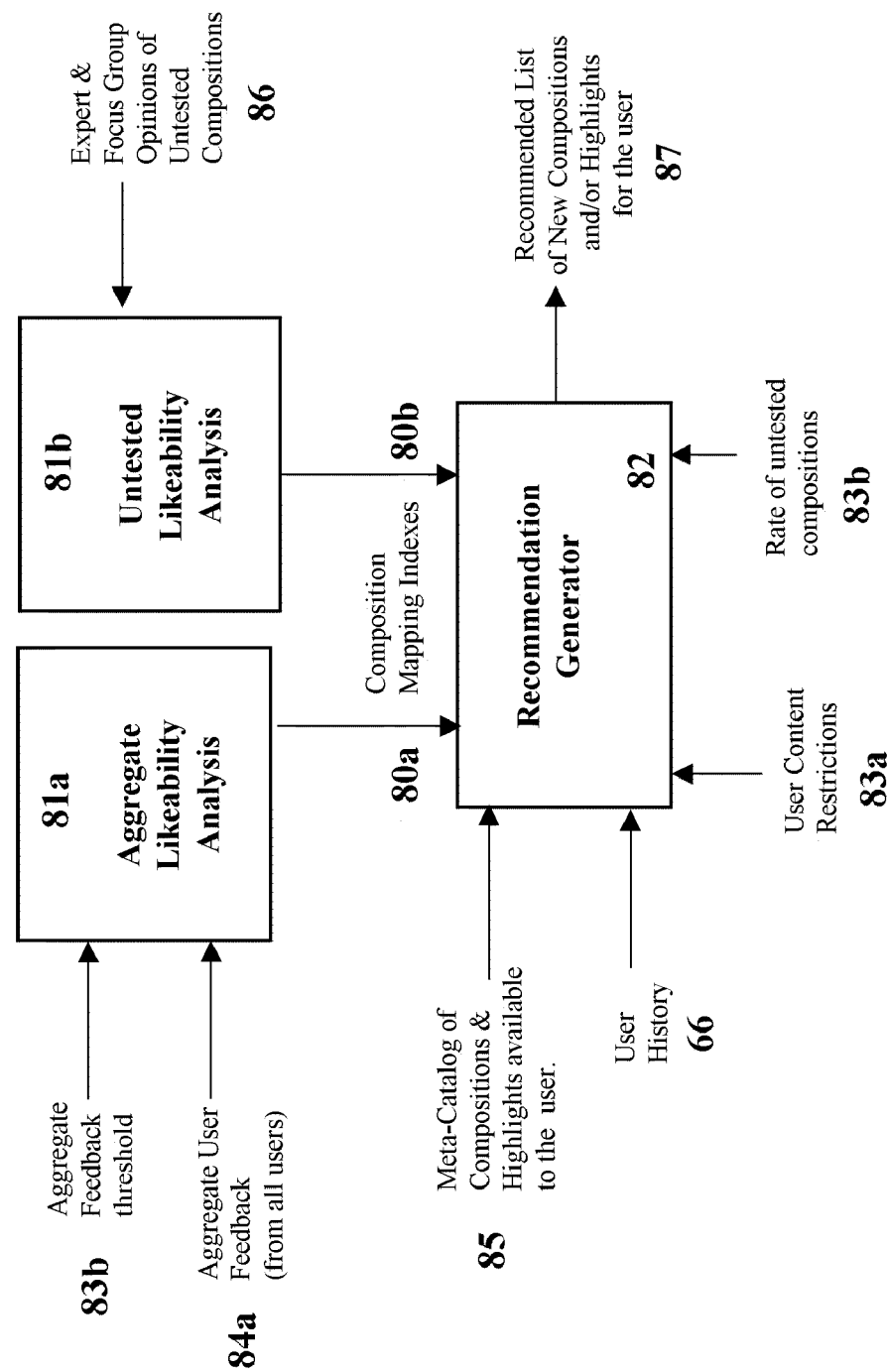
FIG. 8 illustrates a process for recommending new compositions and new highlights for a user.

Selection of New Compositions and Highlights:

A process for generating a "recommended list of new compositions and/or highlights for the user" 87 which is customized for each user is shown in FIG. 8. The recommendation generator 82 for new compositions and highlights may utilize the user's history 66 and common likeability indexes (composition mapping indexes) 80a & 80b, in-order to provide a customized experience for each user. The "recommendation list" 87 for each user may also be dependent on the "Meta-catalog of compositions and highlights available to the user" 85. The meta-catalog available to a given user may not include all the compositions available in the world. The meta-catalog 85 available to a user may be limited due to considerations that may include: the user's subscription plan or user purchase limitations or limitations imposed by an particular experience provider.

A common likeability index may contain a mapping of "if liked composition(s)" then "also liked compositions". An example of simple one-to-one likeability index of compositions (i.e., composition mapping index 80) is shown in FIG. 9. For each "if liked composition #" shown in column 1 a list of "also liked composition #'s" are listed in column 2. For example, if composition 854108 is liked then compositions 883491, 103293, and 527177 will probably also be liked. This mapping may be determined by some combination of experts, focus groups, or by an analysis of the aggregate feedback of all users. If the aggregate feedback of all users is employed, then the index may keep track of additional parameters such as "# Users mapped", "# users liking both" and "% users liking both". The aggregate "likeability" mapping analysis may be based on either "current likeability" or "peak likeability" values for the composition.

An example of a more complex many-to-one likeability index (mapping) of compositions is shown in FIG. 10. For each group of "n" (=3 in FIG. 10) "if liked composition #" shown in columns 1 to 3, a list of "also liked composition #'s" are listed in column 4. For example, if compositions 854108, 883491 and 107389 are liked, then compositions 230845, 632952 and 428503 will probably also be liked. To reduce searching, the indexes may be maintained in numerical order and/or with numerical cross-references.

When a new composition is first released it may be considered to be "untested" since no aggregate user history is available. "Expert and focus group opinions" 86 may be used to perform an initial "untested likeability analysis" 81b. Based on the initial index (mapping) 80b, the new composition may be sampled (possibly as highlights) to a limited number of users in-order to obtain "aggregate user feedback" 84a from enough users to perform a "common likeability index analysis" 81a and create an aggregate composition mapping index 80a. Once the "aggregate likeability analysis" 81a is based upon a sufficient amount of "aggregate user feedback" 84a (i.e., exceeds an "aggregate feedback threshold" 83b), the aggregate index (mapping) 80a may then replace the initial expert generated likeability index 80b. In this way, untested new compositions are not widely distributed to new users until an initial aggregate feedback establishes their likeability with a smaller number of users. In this manner, a greater variety of new compositions may be each initially tested with a small subset of all users without burdening any one user with many untested compositions. Alternatively, "cutting edge" users may be offered the option of subscribing or activating a special "untested" mode and to be exposed to a greater number of untested compositions. A "rate of untested compositions" parameter 83b may be used to control each user's preferred amount of exposure to "untested" compositions and/or highlights.

A list of recommended new highlights and/or compositions for each user may be generated in advance at the experience providers network location. The list is ranked and ordered based on compositions that are most likely to be pleasing to the user. Depending on the rankings and quantity of highlights previously downloaded and still unused at the user's device, some or all of the highlights in the revised highlight list are downloaded into the user's device so they are immediately available if requested by user action. The full composition may also be down loaded at the same time as the highlight so it is immediately available if the user requests the full composition be played upon hearing the highlight.

Another optional enhancement, is to additionally constrain the recommended new compositions and highlights based on "user content restrictions" 83a. Each composition may be pre-tagged by restriction categories, by the content providers or content rating providers. Restriction categories may be based on factors such as the user's age, language, violence, sex content, etc. The content restrictions are settable by either the user or the user's guardian (through password protection), in-order to prevent the recommendation and playback of highlights/compositions from undesired categories.

Composition Finder using Recognition-Snippets:

Another optional enhancement is the composition finder tool to aid the user in finding a particular composition in a group of compositions by audio sound. Associated with each composition is a short recognition-snippet (sound segment) which has been pre-selected as the most quickly recognized portion of the composition. The recognition-snippet may be a separate sound segment (file) that is a few seconds long, representing a highly distinguishable part of the composition. Alternatively, the recognition-snippet may be defined by start and end pointers into the full composition itself. The choice of the highly recognizable portion(s) of each composition may be made by the artists, experts, focus groups, or others. The recognition-snippet is expected to be different and shorter than the highlight-snippet.

The composition finder is useful whenever the user wants to locate a specific composition in a group of compositions. Examples of groups of compositions where the composition finder may be used include:

1) A set of user favorites ordered from most favorite to least favorite. 2) A set of recent plays ordered from most recent to least recent. 3) A set of compositions by an artist (such as an album or collective works). The set may be ordered by highest to lowest estimated user likeability or another order, appropriate to the user's request. 4) A set of compositions in a particular genre. The set may be ordered by highest to lowest estimated user likeability or another appropriate order. 5) A set of compositions resulting from a user initiated search. The search results are ordered from highest to lowest probability of matching the user's request. The search request my have been initiated by any means, including a user's verbal (voice) request for a specific composition, where there are multiple compositions that match the request.

Figure 11:
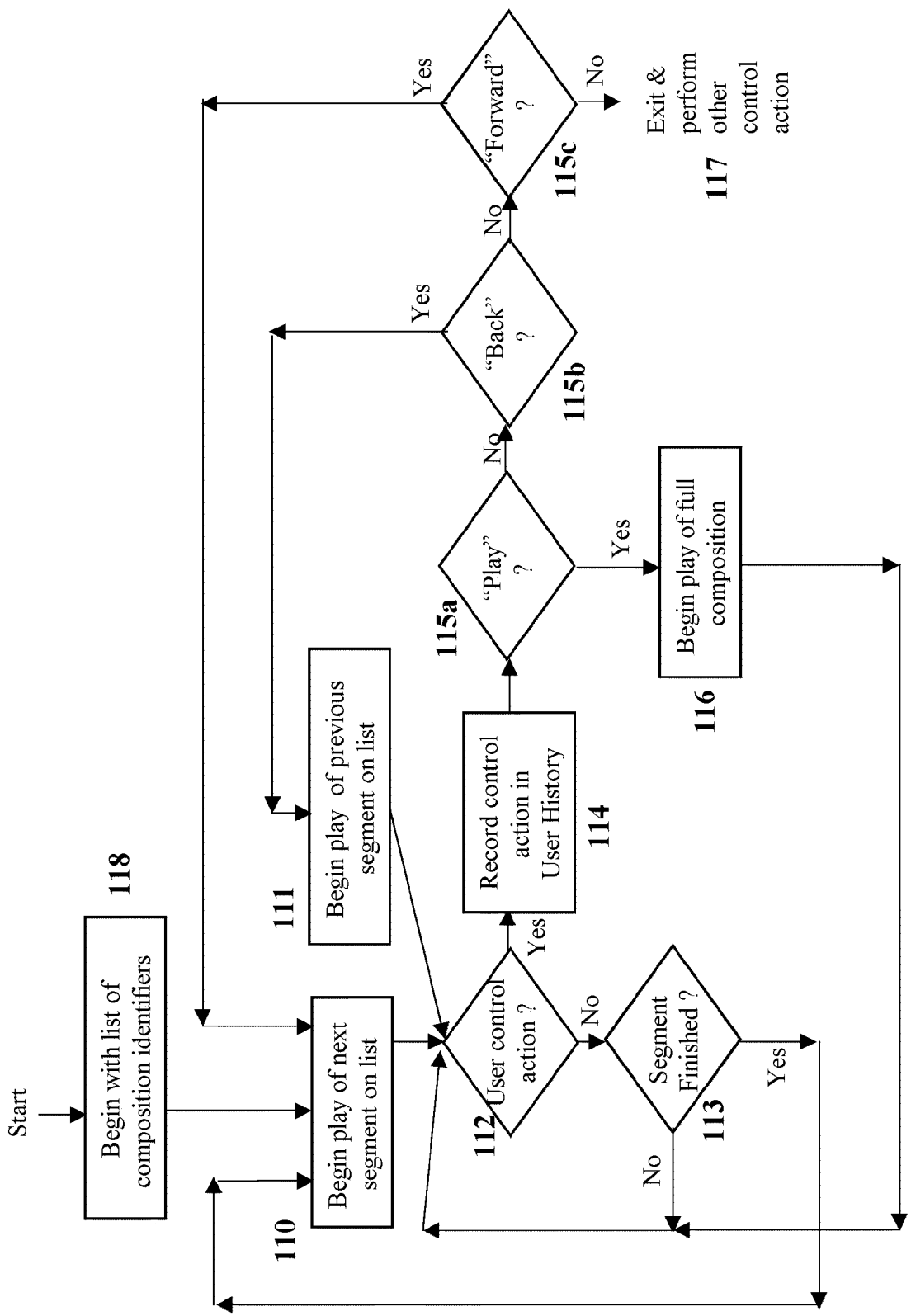
FIG. 11 is a flow diagram of one embodiment of an audio composition finder.

FIG. 11 is a flow diagram of one embodiment of a audio composition finder. Entry into the composition mode may occur when the user initiates control action(s) to locate a specific composition in a group of compositions. Referring to FIG. 11, the process begins with a list of composition identifiers 118. The finder begins by playing of the recognition-segment for the first entry in the ordered list of identifiers 110. When there is no user control action 112 and the segment has finished playing 113, the recognition-segment corresponding to the next entry on the ordered list of identifiers is played 110. The playing of the recognition-segment for the following entries in the ordered list, continues until there is user control action. When there is user control action 112, the control action is recorded 114 as "user history" (feedback) and may be associated with the composition that was playing when the user control action occurred. If the control action was "Play" 115a, then the playing of the full composition is begun 116 and positive feedback on the composition is added to the "user history". The full composition is played to the end, unless user control action is taken 112. If the user control action is "Forward" 115c, then the currently played segment or composition is stopped and play begins on the next segment on the ordered list 110. If the user control action is "Back" 115b, then the currently played segment or composition is stopped and play begins on the previous segment on the ordered list 111. If a user control action other then "Play", "Back" or "Forward" occurs, then the favorite finder mode may be exited and action appropriate to the other control action is performed 117.

In a more general application of the composition finder, the user makes a (possibly verbal) request for which several compositions satisfy the request criteria due to the ambiguity of the request. The list of compositions satisfying the request may be ordered based on probability of being what the user wanted. The composition finder is then used to quickly find the desired composition. Many other uses for the composition finder may be employed within the scope of this invention.

An example is the use of the composition finder to help the user find a specific favorite composition for immediate playback. Based on data in the "user's history", a list of the user's favorites may be ordered from currently most favorite to least favorite. When the user activates the appropriate control(s), an audio sequence of recognition-snippets, in order of most favorite to least favorite, may be played for the user. The user may activate the "forward" or "back" controls to more quickly navigate through the recognition-snippets. When the user hears the "snippet" for the desired composition, the user activates (presses) the "play" (or "like") control to hear it. The use of recognition-snippets allows the user to more quickly locate the desired composition, especially compared with using the beginning of each composition which is often not as immediately distinguishable as other portions of the composition.

In this manner, the user may quickly find a specific composition without viewing a display or scrolling though window(s) of visual information. It is particularly suitable where user visual distractions are dangerous or undesirable such as when driving an automobile or listening to music in the dark.

"Capture" Mode:

Another optional enhancement, is the "Capture" (or "Identify") mode. This mode is used to identify a particular composition the user enjoys but which is being generated by some other external source. Examples of external sources include compositions heard on the radio or television, at a movie, in public or at a friend's house. The mode may be initiated when the user activates a "Capture" control 46 as in FIG. 4. When activated, a microphone 47 in the user device coverts a portion of the external sound into an analog signal. An analog to digital converter is then used to convert the analog signal into digital sound samples. An analysis is performed to identify the particular composition so it may be presented to the user at a later time for feedback and possible addition to the user's list of favorites. The capture mode may be initiated by the user activating (pressing) a "capture" control 46. In one embodiment, the device captures a sample of the external sound into its memory and then automatically forwards the sample to a "composition identification function" which is remotely located at the experience providers network location. The user display may optionally provide a momentary indication to the user that the identification of the captured composition was successfully completed and optionally provide information about the composition to the user. When the identification process was ambiguous, the list of possibilities may be presented to the user via the "composition finder using recognition-segments".

"Share" Mode:

Another optional enhancement, is the "share" mode/capability. This allows one user to share a share list of composition(s) with a second user. The first user identifies the user ID where the share list of composition identifier(s) is to be sent to. The share list is forwarded across a network such as the internet to the second user's profile. If the second user accepts the share list from the first user, those compositions which are "new to the user", may be added to the second user's recommended new compositions and highlights list 87. Later, highlights or the full compositions are presented to the second user. Those highlights or compositions then receiving favorable feedback are then added to second user's favorites list (user history).

In an alternative embodiment, the share list is transferred directly between user devices via electromagnetic or sound waves (for example, RF or IR transmission such as Bluetooth) with or without the use of a network. The second user's device then automatically forwards the share list to their experience provider for possible incorporation into the second user's "recommended new compositions and highlights list" 87.

User Channels, Moods and/or Categories:

The device may optionally allow the user to create a plurality of uniquely defined channels, each for a different user mood, activity, event or category of music. For example, the user may desire a dinner music channel, dance music channel, commuting channel, romantic channel, etc. As with a normal radio, at power-on the device may start playing at the last channel the user was at.

The user's channels may be accessed via the "My" channels control 43a shown in FIG. 4. In one embodiment, the favorite (most used) user channel starts playing when the "My" channels control is activated (pushed). The remaining user channels are ordered from most used to least used and are reached using the channel "up" 43c and "down" 43d controls. The list may be wrapped around so pressing "up" 43c when at "most used" channel will wrap to the "least used" channel. Pressing "down" 43d at the "least used" channel may wrap to the "most used" channel. If the user has only defined one channel, then the "up" and "down" controls wrap on the single channel and hence do not cause a channel change. As shown in FIG. 4, the display 40 may indicate the name of the current user channel playing and how many other user channels are available. The display may include a channel slider 44 to indicate where the channel is relative to the user's favorite channel (based on the user's history of channel activity and feedback). A slider 44 position at the top may be used to indicate the user's most favorite channel. A slider 44 position at the bottom may be used to indicate the user's least favorite channel. The size of the slider relative to the slider range may be used to provide an indication of the size of a channel relative to the total number of user channels. For example, if there are 5 user channels then the size of the slider is displayed as one fifth of the slider range.

The user may begin the creation of a new user channel by activating the "Create" channel control 43b. The user now has access to a plurality of "starting" channels (possibly 100's) via the channel "up" 43c and "down" 43d controls. In one embodiment, each "starting" channel may be playing "highlights" representing a different mood or category of music. The ordering of the "highlights" channels may be based on the user's history (and the aggregate experience of similar users), so that the most likely pleasing "highlight" channels for each user, require the fewest pushes of the channel "up" 43c and "down" 43d controls. The user provides feedback about each channel by the amount of time spent at a channel. The user also provides feedback on each "highlight" while it is playing via the "forward" 42c, "back"42f, "like" 42g and "play" 42d controls. All the feedback history is retained for use the next time the "create channel" mode is entered. Once the user has generated a threshold amount of positive feedback on a "highlight" channel, a new user channel may be automatically added to the user's channel list. Until the user has provided a second higher threshold of feedback, the new channel may tend to provide a larger number of highlights in-order to allow the user to more quickly tune the channel to the user's preferences.

As another optional capability, the user would be able to define a playback by artist, album, title, time period, musical category, etc or search a catalog based on such parameters.

Methods for deleting, splitting and merging channels may be incorporated into the user device.

Different "starting" channels, may be created by the same or by different experience providers but all channels would utilize a single, common collection of user usage-rights tokens.

Network Strategies:

It is expected that each user will have multiple devices that need to be synchronized such that any changes to the user's history and user's collection (i.e., the user's library of compositions) at any one device is also automatically made available, in a timely manner, to all the other devices a user will be using. For example, any changes made in the automobile on the way home will be immediately available, in the ideal, to devices in the user's home.

In one embodiment, each user device would be capable of establishing two way communication in-order to interact with the experience provider over a wireless or wired connection to a network such as the internet.

When the user's device has sufficient storage, the user's favorites may be stored locally and the general network strategy is to download the most likely needed compositions and highlights well in advance of actual need by the user's device. Having storage in each device is more accommodating to poor quality, intermittent, or missing network connections.

When a local device has sufficient local storage, the network interface may be managed to minimize communication costs. For example, the largest downloads and uploads may be scheduled during those times (of the day or night or week) when the communication costs are lower. For example, downloads of new compositions and highlights may occur, automatically without user action, in the middle of the night and then stored within each device for possible use during the following days. More information may be downloaded than is typically expected to be needed, just so it will be available if needed. Since the typical user's tastes change slowly over a period of days, the locally stored library of compositions and snippets will be fairly up-to-date but the sequence of playbacks when switching devices (e.g., car to house) may be less then ideal, since the most recent user history would not be exchanged until later that night. If desired, the less data intensive user history/feedback may be communicated more frequently, while the more data intensive downloads are restricted to lower cost communication times.

Another alternative is to broadcast and/or multicast the data intensive information (compositions and highlights) to multiple users simultaneously over the network. Prior to the broadcast or multicast, each user device receives an update on what new compositions and highlights that user needs. The user devices then monitor the broadcast or multicast, and save the appropriate data the user is expected to need.

User devices may also network directly with each other or over a network to pass update information. In remote locations where networked access is not available, the update to the remote devices may be handled by a portable device carried from a networked area into the remote area. The portable device then networks with the remote devices to update them. Similarly, after leaving the remote area and re-establishing a network connection. the portable device may update the depository with the user feedback that occurred in the remote area. In this case, the user's devices may directly interact to share information when they are within communication range with each other. Such direct communication may be accomplished by IR or RF means such as WiFi or Bluetooth.

The invention may also be embodied via streaming over a network connection such as the internet. With streaming, the personalized sequence is generated at the experience provider's location on the network (e.g., internet) and forwarded, wired and/or wirelessly, to the user's device as a stream of packets. The user's device is simplified since it must only convert the packets into the entertainment sequence (e.g., sound sequence) and send the user's feedback back across the network to the experience provider. Streaming reduces the needed amount of local storage and local processing in the user's device. Usually a small local memory (such as a FIFO or double buffer) is used in the local device to provide a continuous sound stream on the output side, despite fluctuations in the receipt and processing of packets across the network connection. A disadvantage of streaming is that a virtually continuous interactive network connection at an effective bandwidth must be available. Another major disadvantage is that the network connection must have an acceptably low interactive latency so the experience provider's streaming source may quickly adjust to the user's feedback and control inputs (such as the "Forward" and "Back" controls). The need for a higher quality network connection to be continuously available, may make streaming a less desirable alternative.

Business Models:

This invention is capable of simultaneously supporting many different schemes for generating revenue and/or royalties for the experience providers, network providers, composition providers, composition creators and artistic performers. The schemes include:

1) Fee for each composition each time it is played.
2) One time fee for unlimited play of a composition by the user.
3) A fee per minute or hour of experience provided to the user.
4) A flat fee per month independent of the actual user usage.
5) Advertisement supported, where the user must listen to and possibly interact to a certain amount of ad time per a predefined amount of non-ad user time.
6) A certain number of free plays followed by some fee for play.
7) Number of user devices.
8) Number of user devices simultaneously active.
9) Amount of data transferred across the network.
10) Various combinations of the above.

The experience providers may simultaneously manage each of these billing schemes for different groups of users, so the billing scheme may be customized for each user. The history of the aggregate usage for each composition may also be used to determine royalties for the composition creators, composition owners and other service providers.

The experience provider does not need to store an individual library of compositions for each user. The actual compositions may be stored in a common library that is shared by all users and accessed based upon a user profile maintained for each user. The amount of access bandwidth provided for each composition may be adjusted to match aggregate user demand. For example, a currently popular composition that is being downloaded by many users, may be made available from many servers across the network in-order to meet the demand. While a less popular composition may be made available from significantly fewer servers on the network.

As an optional enhancement, the user may be allowed to use the "forward" control to skip any offensive or unwanted advertisement (ad). Alternative ads are then presented to the user until the required user ad time is satisfied. When the user wants additional information about the product in an ad, the user activates (presses) the "like" control. Additional information is then presented. The user may also activate the "back" control to hear an ad again in-order to repeat needed information such as a phone number or address. The user's account is credited for the additional ad time heard. The user's use of the "forward" and "back" controls during ads may be used to more closely target future ads to the user.

This invention may accommodate various encryption schemes in-order to protect from piracy or user attempts to interfere with the collection of billing information.

Initial System Customization to the User:

To more efficiently perform customization of the system for each user, a large display with an interactive user interface may be utilized across a network during the initial user customization process. The user may answer forms on the user's interests, hobbies, categories or products of interest, etc.

This may include the establishment of methods for confirming the user's identity at the start of future device sessions. This may include capturing sound to be used for voice recognition of the user's name or other specific words, biometrics measurements of the user such as fingerprint on the start control, or camera imaging of the user's face.

The user may also indicate initial preferences for advertisement categories. In this mode, the user may be presented with different product categories and product types for which the user may use the "Like" control to indicate relative interest in.

The user may also wish to customize of the type and frequency of news, weather, traffic, etc based on the day of week, time of day, location of user, etc.

The initial preferences the user provides are only the starting point. User feedback, indicated by normal user control actions, is utilized to continuously adopt the entertainment sequence more uniquely for each individual user.

User History Timeline:

In another optional extension, the actual timeline of a user's history of feedback and favorites may be made available to the user via an interactive interface and display. As an example, the user would be able to review what was listened to at any earlier time period or time interval, for example a particular day, week or month during the college years. Such a history review mode or capability may not be needed for most types of user devices.

User Provided Compositions:

In another optional extension, the user would have the capability of providing compositions and highlights to the system. This is useful in cases where the user may have created their own compositions or acquired them locally or where the experience provider does not have access to certain compositions.

Additional Applications of the Invention:

In order to more clearly illustrate functionality, portions of the preceding discussion were oriented toward a playback device with a manually controlled interface, however the invention may utilize any type of user interface including voice controlled.

In order to more clearly illustrate functionality, portions of the foregoing discussion were described in terms of music and/or music videos, however this invention is more generally useful for the generation of any type of personalized entertainment experience that is customized for each user. The entertainment experience that is personalized for each user may be comprised of a sequence of any type of entertainment compositions including music, music videos, short films, movies, video programs, audio versions of books, talks, speeches, voice content, lectures, etc.

The invention claimed is:

1. An apparatus-implemented method for personalized music or entertainment, the method comprising:
   capturing, at a user-device, details of control actions by a user on pieces or compositions;
   storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and automatically selecting at least one piece or composition for playback, by using a relationship that defines a time between playbacks of the selected piece or composition, which varies with the magnitude of said rating of the user for the selected piece or composition.

2. The method of claim 1, further comprising: automatically initiating the playback of said selected piece or composition for said user.

3. The method of claim 1, wherein said relationship defines a plurality of different values for the time between playbacks.

4. The method of claim 1, wherein said relationship is defined by a curve.

5. The method of claim 1, wherein said relationship is defined by a lookup table or database.

6. The method of claim 1, wherein said relationship is defined by an equation or a mathematical function.

7. The method of claim 1, wherein said relationship is non-linear.

8. The method of claim 1, wherein said relationship is monotonic.

9. The method of claim 1, wherein said relationship is not monotonic.

10. The method of claim 1, wherein the more favorable a rating for a piece or composition, the time between playbacks of the piece or composition is shorter.

11. The method of claim 1, wherein, when a said user's rating for an a said piece or composition is below a defined level of preference, the said piece or composition is not selected again until at least a defined amount of time has elapsed from a prior playback of the said piece or composition.

12. The method of claim 1, wherein when a user's rating for a said piece or composition is below a defined level of preference, that piece or composition is not selected.

13. The method of claim 1, wherein said control actions are user actions that affect a playback of a piece or composition during its playback.

14. The method of claim 1, wherein said control actions are user actions to repeat or replay, a piece or composition that previously played; and wherein a said user's rating is adjusted to a higher preference, by a said user control action or actions to repeat or replay, the piece or composition.

15. The method of claim 1, wherein said control actions are user actions to find, select or designate, a particular piece or composition for playback; and wherein a said user's rating is adjusted to a higher preference, by a user control action that finds, selects or designates the piece or composition for playback.

16. The method of claim 1, wherein said control actions are user actions to search or find a specific piece or composition; wherein a said user's rating is adjusted to a higher preference, by a said user control actions to search or find the specific piece or composition.

17. The method of claim 1, wherein said control actions are user actions to skip or forward-past an ending portion of a currently playing piece or composition; and wherein a said user's rating is adjusted to a lower preference, by a user control action or actions that skip or forward-past, the ending portion of the piece or composition that is currently playing.

18. The method of claim 1, wherein said control actions are user actions to stop a currently playing piece or composition; and initiate playback of another piece or composition; wherein a said user's rating associated with the playing piece or composition is adjusted to a lower preference, by a user control action or actions that stop the piece or composition that is playing; and initiate playback of another piece or composition.

19. The method of claim 1, wherein said control actions are user actions to cause a piece or composition that has finished playing, to start playing again; wherein a said user's rating is adjusted to a higher preference, by a said user control action or actions to start playing again.

20. The method of claim 1, wherein the sooner said user takes control action, to stop a currently playing piece or composition, in-order to experience another piece or composition; the more the rating for the stopped piece or composition, is adjusted to a lower preference.

21. The method of claim 1, wherein the sooner the user takes control action to avoid a piece or composition that is playing, the more the rating, for the avoided piece or composition, is adjusted toward a lower preference.

22. The method of claim 1, wherein, once a piece or composition has played for at least a recognition-time, the sooner a control action to avoid the piece or composition, the more the rating, for the avoided piece or composition, is adjusted toward a lower preference.

23. The method of claim 1, further comprising: playing a sequence of said selected pieces or compositions, when there are no user control actions available to be applied or satisfied.

24. The method of claim 1, further comprising: automatically playing by a user-device, a sequence of pieces or compositions; wherein the pieces or compositions were custom selected for said user by using the ratings associated with the user.

25. The method of claim 1, wherein the rating for a specific piece or composition is determined by using a plurality of control actions that occurred on a plurality of different occasions, and were applied by the user on the specific piece or composition.

26. The method of claim 1, wherein a rating for a specific piece or composition is determined using a plurality of individual said user control actions that occurred on a plurality of different occasions and/or at different user-devices; wherein said control actions were applied to the specific piece or composition.

27. The method of claim 1, wherein the magnitude of the rating for a piece or composition is increased by some control actions, and the magnitude of the rating for a piece or composition is decreased by other control actions.

28. The method of claim 1, wherein some user control actions cause the rating to be adjusted to a higher magnitude, and other user control actions cause the rating to be adjusted to a lower magnitude.

29. The method of claim 1, further comprising: adjusting the magnitude of a said user's rating to a more favorable preference due to control actions that occurred on a first occasion; and adjusting the magnitude of a said user's rating to a less favorable preference due to control actions that occurred on a second occasion.

30. The method of claim 1, wherein a rating is stored in one or more memories until a magnitude of the rating is updated by control actions that are more recent.

31. The method of claim 1, wherein a said user's rating is updated by adjusting the magnitude of a prior rating, toward a higher or lower preference, based on the details of a newer user control action that was applied to the piece or composition.

32. The method of claim 1, further comprising:
storing, in a memory or memories, the details about individual control actions, for a plurality of control actions on a said piece or composition, that occurred on different occasions and/or at different user devices;

processing, in order of control action occurrence, a plurality of said stored details about control actions, to determine the magnitude of the rating for the piece or composition.

33. The method of claim 1, further comprising:

storing, in a memory or memories, the details about individual control actions, for a plurality of control actions on a said piece or composition, that occurred on different occasions and/or at different user devices;

processing, in order of control action occurrence, a plurality of said stored details about control actions to determine the magnitude of the rating for the piece or composition; wherein the user's rating is adjusted toward a more favorable magnitude by some control actions; and wherein the rating is adjusted to a less favorable magnitude by other control actions.

34. An apparatus-implemented method for personalized music or entertainment, the method comprising:

capturing, at a user-device, details of control actions by a user on pieces or compositions; wherein said details include a number of times a piece or composition was heard by the user;

storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and automatically selecting at least one piece or composition for playback, by using a relationship that defines a time between playbacks of the selected piece or composition which varies with: the magnitude of said rating of the user for the selected piece or composition, or the number of times the selected piece or composition was heard by the user.

35. The method of claim 34, wherein said relationship is defined by a curve, a lookup table, a database, an equation or a mathematical function.

36. The method of claim 34, wherein said relationship is non-linear.

37. The method of claim 34, wherein said relationship is monotonic.

38. The method of claim 34, wherein said relationship is not monotonic.

39. Apparatus for personalized music or entertainment, said apparatus comprising:

means for capturing at a user-device, details of control actions by a user on pieces or compositions;

one or more memories that store, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and a processor that automatically selects at least one piece or composition for playback, by using a relationship that defines a time between playbacks of the selected piece or composition which varies with the magnitude of said rating of the user for the selected piece or composition.

40. The apparatus of claim 39, wherein said relationship is defined by a curve, a lookup table, a database, an equation or a mathematical function.

41. The apparatus of claim 39, wherein said relationship is non-linear.

42. The apparatus of claim 39, wherein said relationship is monotonic.

43. The apparatus of claim 39, wherein said relationship is not monotonic.

44. One or more computer-readable memories or media, not including carrier-waves, having computer-readable instructions thereon which, when executed by one or more processing devices, implement a method of:

capturing, at a user-device, details of control actions by a user on pieces or compositions; wherein said details include a number of times a piece or composition was heard by the user;

storing in one or more memories, a plurality of ratings associated with the user; wherein a rating, indicating a magnitude of preference of the user, is associated with a piece or composition; wherein the magnitude of the rating for the associated piece or composition was determined by using at least some of the details of said control actions by the user on the associated piece or composition; and automatically selecting at least one piece or composition for playback, by using a relationship that defines a time between playbacks of the selected piece or composition which varies with: the magnitude of said rating of the user for the selected piece or composition, or the number of times the selected piece or composition was heard by the user.

45. The one or more computer-readable memories or media of claim 44, wherein said relationship is defined by a curve, a lookup table, a database, an equation or a mathematical function.

46. The one or more computer-readable memories or media of claim 44, wherein said relationship is non-linear.

47. The one or more computer-readable memories or media of claim 44, wherein said relationship is monotonic.

48. The one or more computer-readable memories or media of claim 44, wherein said relationship is not monotonic.

* * * * *